US012529893B2

(12) United States Patent
Heald et al.

(10) Patent No.: US 12,529,893 B2
(45) Date of Patent: Jan. 20, 2026

(54) AUGMENTED REALITY DEVICE AND METHODS OF USE

(71) Applicant: Brilliant Labs Private Limited, Singapore (SG)

(72) Inventors: Benjamin Raymond Heald, Northwich (GB); Bobak Tavangar, Washington, DC (US); Rajesh Nakarja, Stockholm (SE)

(73) Assignee: Brilliant Labs Private Limited, Singapore (SG)

( * ) Notice: Subject to any disclaimer, the term of this patent is extended or adjusted under 35 U.S.C. 154(b) by 0 days.

(21) Appl. No.: 18/395,051

(22) Filed: Dec. 22, 2023

(65) Prior Publication Data

US 2024/0241370 A1     Jul. 18, 2024

Related U.S. Application Data

(63) Continuation-in-part of application No. 18/202,022, filed on May 25, 2023, now Pat. No. 11,906,734,
(Continued)

(51) Int. Cl.
*G02B 27/01*     (2006.01)
*G02B 5/04*     (2006.01)
(Continued)

(52) U.S. Cl.
CPC ........... *G02B 27/0101* (2013.01); *G02B 5/04* (2013.01); *G02B 27/0172* (2013.01);
(Continued)

(58) Field of Classification Search
CPC .. G06F 2203/04111; G06F 2203/04112; G06F 3/0412; G06F 3/0443;
(Continued)

(56) References Cited

U.S. PATENT DOCUMENTS 6,057,966 A * 5/2000 Carroll ............... G02B 27/0172
359/630
6,292,301 B1 * 9/2001 Kuramochi ........ G02B 27/0172
359/630

(Continued)

*Primary Examiner* — Ryan A Lubit
(74) *Attorney, Agent, or Firm* — Cognition IP, P.C.; Edward Steakley

(57) ABSTRACT

Computer-implemented methods of operating an augmented reality device can involve capturing camera images, processing the camera images, and displaying virtual display images. The camera images can be captured automatically using a camera disposed within an augmented reality device worn by a user. The camera images can be processed automatically using a processor located within the augmented reality device. The virtual display images can be displayed automatically to the user within the augmented reality device while the user is looking through the augmented reality device and simultaneously viewing real objects through the augmented reality device. The virtual display images can be based on the processed camera images. Additional steps can include accepting a first user input, storing camera image(s) on a memory located within the augmented reality device based on the first input, accepting a second user input, and displaying stored image(s) to the user based on the second input.

14 Claims, 32 Drawing Sheets

Related U.S. Application Data which is a continuation-in-part of application No. 18/127,319, filed on Mar. 28, 2023, now Pat. No. 12,248,145, which is a continuation of application No. 17/881,160, filed on Aug. 4, 2022, now Pat. No. 11,640,056, which is a continuation of application No. 17/687,576, filed on Mar. 4, 2022, now Pat. No. 11,448,879.

(60) Provisional application No. 63/298,206, filed on Jan. 10, 2022, provisional application No. 63/297,689, filed on Jan. 7, 2022.

(51) Int. Cl.
   *G02B 27/18* (2006.01)
   *G06T 19/00* (2011.01)

(52) U.S. Cl.
   CPC ......... *G02B 27/0176* (2013.01); *G02B 27/18* (2013.01); *G06T 19/006* (2013.01); *G02B 2027/0138* (2013.01); *G02B 2027/014* (2013.01); *G02B 2027/0178* (2013.01)

(58) Field of Classification Search
   CPC ... G06F 3/0446; H01L 27/322; H01L 27/323; H01L 27/3246; H01L 51/5284; H04N 5/2257
   See application file for complete search history.

(56) References Cited

U.S. PATENT DOCUMENTS

| | | |
|---|---|---|
| 6,421,031 B1 * | 7/2002 | Ronzani ............ G02B 27/0172 359/630 |
| 6,523,629 B1 | 2/2003 | Buttz et al. |
| 11,782,271 B2 | 10/2023 | Tavangar et al. |
| 2013/0009853 A1 * | 1/2013 | Hesselink ............ G02B 27/017 345/8 |
| 2015/0379963 A1 | 12/2015 | Holmanu |
| 2017/0185738 A1 * | 6/2017 | Moharir ................... H04N 5/77 |
| 2017/0372457 A1 * | 12/2017 | Sylvan .................... G06F 1/163 |
| 2018/0081429 A1 * | 3/2018 | Akenine-Moller ..... G06F 3/013 |
| 2018/0276830 A1 | 9/2018 | Bostick et al. |
| 2020/0150602 A1 | 5/2020 | Trikha et al. |
| 2020/0219492 A1 | 7/2020 | Apsingekar et al. |
| 2021/0026139 A1 | 1/2021 | Harder et al. |
| 2021/0063742 A1 * | 3/2021 | Lee .................... G02B 27/0176 |
| 2021/0082554 A1 | 3/2021 | Kalia et al. |
| 2021/0173480 A1 * | 6/2021 | Osterhout ........... G06F 3/04815 |
| 2021/0181533 A1 * | 6/2021 | Kim .................... G02B 27/0172 |
| 2021/0225391 A1 * | 7/2021 | Wexler ................... H04R 1/342 |
| 2021/0304507 A1 * | 9/2021 | Smith .................... G06F 3/0481 |
| 2021/0344560 A1 | 11/2021 | Alameh et al. |
| 2023/0136553 A1 | 5/2023 | Olwal et al. |
| 2023/0154032 A1 | 5/2023 | Sinha et al. |
| 2023/0185098 A1 * | 6/2023 | Wang ................. G02B 27/0176 345/8 |
| 2023/0186908 A1 | 6/2023 | Sharifi et al. |
| 2023/0281955 A1 | 9/2023 | Ackerson et al. |
| 2023/0316666 A1 * | 10/2023 | Aitbayev ............... G06V 10/70 |
| 2024/0204391 A1 * | 6/2024 | Niakan ................... H01Q 9/30 |

* cited by examiner

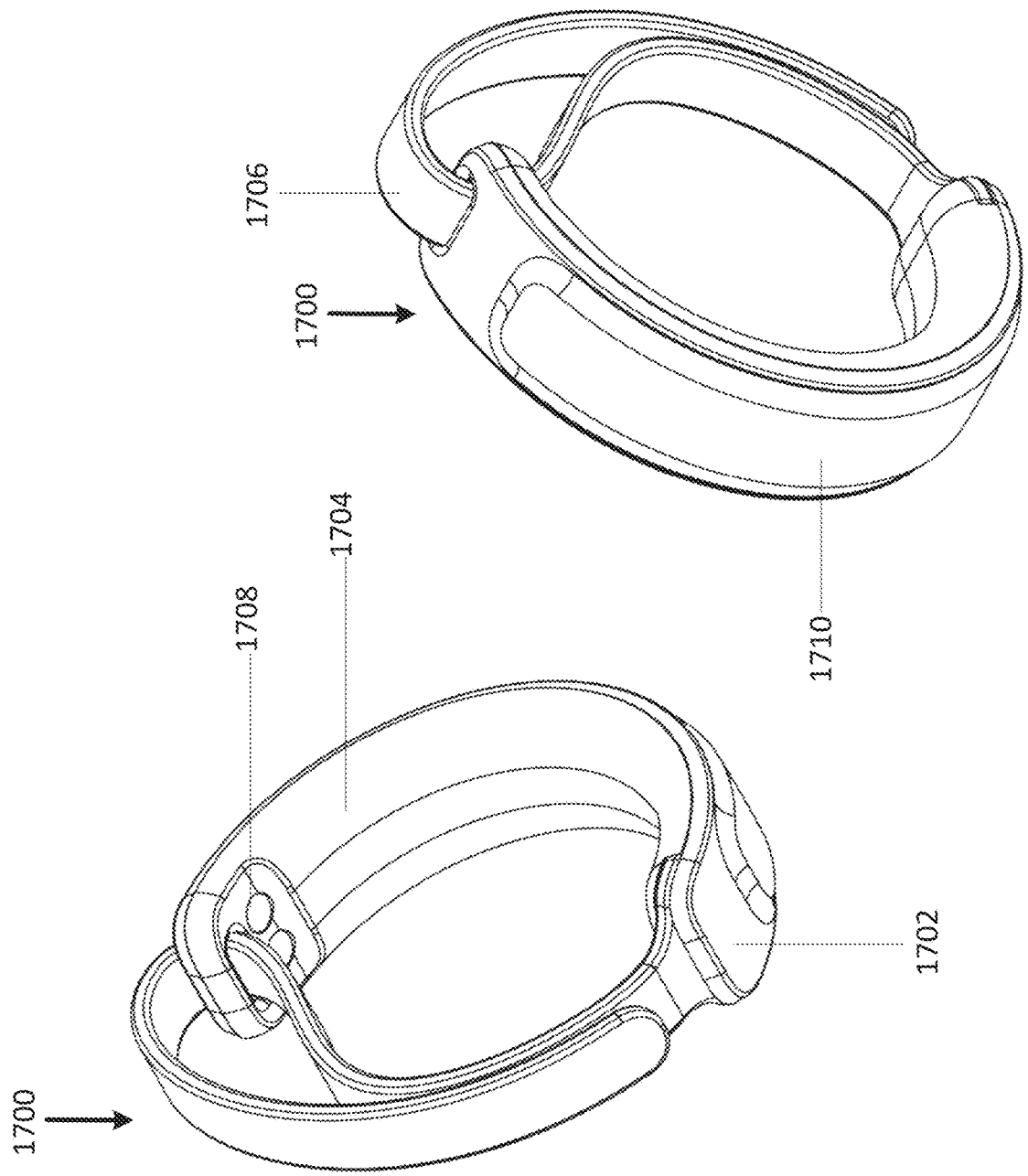

AUGMENTED REALITY DEVICE AND METHODS OF USE

CROSS-REFERENCE TO RELATED APPLICATIONS

This application is a continuation-in-part of and claims priority to and commonly owned U.S. patent application Ser. No. 18/202,022, filed on May 25, 2023, entitled "AUGMENTED REALITY DEVICE AND METHODS OF USE", which is a continuation-in-part of and claims priority to and commonly owned U.S. patent application Ser. No. 18/127,319, filed on Mar. 28, 2023, which is a continuation application of U.S. application Ser. No. 17/881,160, filed on Aug. 4, 2022, issued as U.S. Pat. No. 11,640,056, entitled "AUGMENTED REALITY DEVICE AND METHODS OF USE", which is a continuation of U.S. patent application Ser. No. 17/687,576, filed on Mar. 4, 2022, issued as U.S. Pat. No. 11,448,879, entitled "AUGMENTED REALITY DEVICE AND METHODS OF USE," which application is hereby incorporated by reference in its entirety. This application also claims the benefit of U.S. Provisional Patent Application Nos. 63/297,689, filed on Jan. 7, 2022, and 63/298,206 filed on Jan. 10, 2022, both entitled "AUGMENTED REALITY DEVICE AND METHODS OF USE," and both applications of which are hereby incorporated by reference in their entireties.

TECHNICAL FIELD

The present disclosure relates generally to electronic devices, and more particularly to wearable augmented reality devices.

BACKGROUND

Virtual reality systems and devices have become increasingly popular in recent years. Various video game arrangements, movie presentation systems, and other devices and systems can allow a user to view and sometimes even interact with a virtual reality world. For example, some sophisticated gaming systems allow a user to wear a headset that provides an entirely virtual environment to see and interact with.

Unfortunately, many virtual reality devices and systems can be unsafe when users are so immersed in a virtual world that they are unaware of their real life surroundings. Because many existing virtual reality devices and systems do not provide an ability to see what real things are there, users have been known to injure themselves or others when they are unable to perceive their real life environments. For those devices and systems that do allow some perception of an actual real life environment, there is typically little to no integration between real life items and virtual reality items. Furthermore, existing devices and systems often have no ability to adjust virtual reality displays and presentations based on the real life environment of a user.

Although traditional ways of providing a virtual or augmented reality for a user have worked well in the past, improvements are always helpful. In particular, what is desired are augmented reality devices and systems that integrate virtual displays and presentations with real life surroundings in a robust and safe manner, and that allow for customized adjustments to the virtual displays and presentations based on the environment of the user.

SUMMARY

It is an advantage of the present disclosure to provide augmented reality devices and methods for using them that integrate virtual displays and presentations with real life surroundings in a robust and safe manner, and that allow for customized adjustments to the virtual displays and presentations based on the environment of the user. The disclosed features, apparatuses, systems, and methods provide improved augmented reality solutions that involve virtual displays that enhance the experience of a user without impairing the ability of the user to perceive and act within their real life environment. These advantages can be accomplished in multiple ways, such as by providing an augmented reality device and system that readily couples to existing eyewear of a user, that provides virtual displays to the user in unique ways, and that records real life events around the user for customized playbacks on the virtual displays.

In various embodiments of the present disclosure, an augmented reality device can include an outer housing, an attachment component, a camera, and a display arrangement. The outer housing can have a front and a back that define parallel planes, are transparent, and are arranged to allow a user to see therethrough. The attachment component can be coupled to the outer housing and can be configured to removably attach the augmented reality device to eyewear of the user. The camera can be disposed within the outer housing and can be configured to capture images through the outer housing front. The display arrangement can be disposed within the outer housing and can be configured to provide a virtual display to the user while the user is looking through the augmented reality device.

In various detailed embodiments, the display arrangement can provide the virtual display to the user when the user looks through the augmented reality device at a viewing angle that is not perpendicular to the outer housing front and back planes. The viewing angle can be downward from the perpendicular through the outer housing front and back planes. The display arrangement can include an image emitting component, a prism component, a projecting optic component, and a combining optic component. In some arrangements, the augmented reality device can include multiple light paths. A first light path can include a virtual image path for the virtual image display within the augmented reality device and a second light path can include a real object path for real images viewable through the augmented reality device. Also, the attachment component can include a clip configured to removably clip the augmented reality device to the front of eyeglasses worn by the user.

In further detailed embodiments, the augmented reality device can also include at least one processor disposed within the outer housing and coupled to the camera and the display arrangement. The at least one processor can be configured to receive camera images from the camera and provide the camera images to the display arrangement as at least a portion of the virtual display images. The at least one processor can also be configured to control one or more camera operations selected from the group consisting of: monitoring user surroundings, taking images, object detection, depth detection, zoom, and first and third person shooting. The augmented reality device can also include at least one memory device disposed within the outer housing and coupled to the at least one processor, and the at least one memory device can be configured to store images captured by the camera. The at least one processor can also be configured to store one or more buffer clips to the at least one memory device of recent events captured by the camera and to replay the one or more buffer clips. The augmented reality device can also include a wireless communication component disposed about the outer housing and coupled to the at least one processor, and the wireless communication component can be configured to facilitate communications with devices separate from the augmented reality device.

In some arrangements, the display arrangement can include a unibody optics enclosure, which can include an image emitting component, a unibody top prism, a unibody bottom prism, a combining optic component, and a projecting optic component. The unibody top prism can be bonded to the unibody bottom prism. At least one processor can be disposed within the unibody top prism and coupled to the camera and the display arrangement, and this at least one processor can be configured to receive camera images from the camera and provide the camera images to the display arrangement as at least a portion of the virtual display images. At least one memory device disposed within the unibody top prism and coupled to the at least one processor can be configured to store images captured by the camera.

In various further embodiments of the present disclosure, computer-implemented methods of operating an augmented reality device are provided. Pertinent process steps can include capturing camera images automatically using a camera disposed within an augmented reality device worn by a user, processing the camera images automatically using a processor located within the augmented reality device, and displaying virtual display images automatically to the user within the augmented reality device while the user is looking through the augmented reality device and simultaneously viewing real objects through the virtual reality device. The virtual display images can be based on the processed camera images.

In detailed embodiments, the displaying step can include emitting the virtual display images from an image emitting component located within the augmented reality device, passing the virtual display images through a prism component located within the augmented reality device, and projecting the virtual display images through a projecting optic component located within the augmented reality device. Additional process steps can include accepting a first input from the user, storing one or more of the camera images on a memory located within the augmented reality device based on the first input, accepting a second input from the user, and displaying one or more of the stored images to the user based on the second input.

In still further embodiments of the present disclosure, an augmented reality system can include one or more non-transitory computer-readable media storing computer-executable instructions that, when executed on one or more processors, cause the one or more processors to perform operations on an associated augmented reality device. The operations can include at least capturing camera images automatically using a camera disposed within an augmented reality device worn by a user, processing the camera images automatically using a processor located within the augmented reality device, and displaying virtual display images automatically to the user within the augmented reality device while the user is looking through the augmented reality device and simultaneously viewing real objects through the virtual reality device. The virtual display images can be based on the processed camera images.

In detailed embodiments, the augmented reality system can also include the augmented reality device. Such an augmented reality device can include an outer housing, an attachment component, a camera, and a display arrangement. The outer housing can have a front and a back that define parallel planes, are transparent, and are arranged to allow the user to see therethrough. The attachment component can be coupled to the outer housing and can be configured to removably attach the augmented reality device to eyewear of the user. The camera can be disposed within the outer housing and can be configured to capture images through the outer housing front. The display arrangement can be disposed within the outer housing and can be configured to provide a virtual display to the user while the user is looking through the augmented reality device. In some arrangements, the augmented reality system can further include a charging case configured to store and charge the augmented reality device. The charging case can include a rechargeable battery, a communications port, and a charging case memory configured to store images communicated from the augmented reality device.

In some embodiments, there is wearable augmented reality device including a frame comprising a frame body. A first arm is hingedly attached to the frame body. A second arm is hingedly attached to the frame body. A camera is positioned in a front portion of the frame body. A first processor positioned in the frame body. An optical display device positioned in a top portion of the frame body. A first lens optical element is coupled to the frame body. A second lens optical element is coupled to the frame body. The second lens optical element has a combiner prism optical element positioned therein.

The wearable augmented reality includes a processor that is configured to project from the optical display device processed camera images towards the combiner prism optical element such that light emitted from the optical display device passes through a top portion of the second lens optical element and the combiner prism optical element. The emitted light is projected from the second lens optical element back toward the combiner prism optical element, and then is reflected from a bottom portion of the combiner prism optical element towards a focused display position towards an eye of a wearer of the wearable augmented reality device.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, systems and methods of use regarding augmented reality devices. These drawings in no way limit any changes in form and detail that may be made to the disclosure by one skilled in the art without departing from the spirit and scope of the disclosure.

FIGS. 17A-17B illustrate views of an example controller according to one embodiment of the present disclosure.

DETAILED DESCRIPTION

Figure 1:
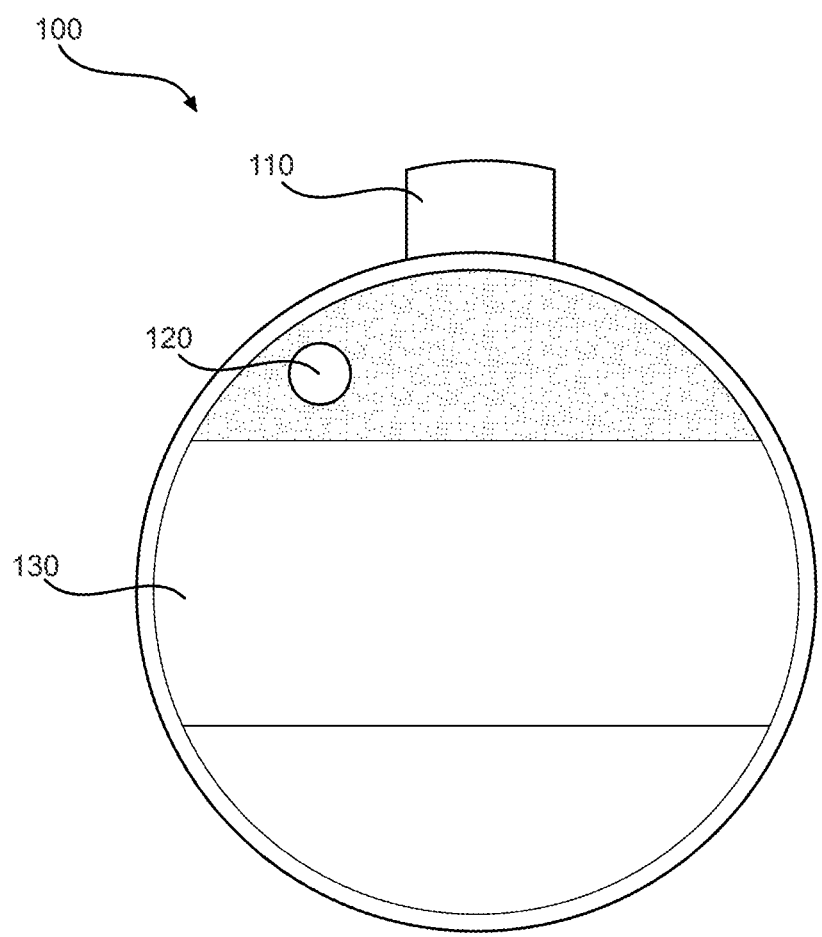
FIG. 1 illustrates in front elevation view an example augmented reality device according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods for augmented reality devices. The disclosed embodiments can include augmented reality devices and methods for using them that integrate virtual displays and presentations with real life surroundings in a robust and safe manner, and that allow for customized adjustments to the virtual displays and presentations based on the environment of the user. In particular, the disclosed embodiments can utilize an augmented reality device that is wearable by a user and that preferably can be readily coupled to eyewear of the user.

Such an augmented reality device can be called a "monocle," which can be a relatively small wearable device having a near-eye optical engine equipped with a camera and a display that are configured to capture visual data, process that data on the device, and display the resulting processed data as images and videos optically in front of the eye of the user while simultaneously transferring that data wirelessly off device.

In various detailed examples, which are merely illustrative and non-limiting in nature, the disclosed monocle can use one or more cameras and processors to monitor user surroundings, take images, and detect objects and depth information, as well as to provide zoom, pan, and tilt functionalities, language translation, health monitoring, and first and third person shooting, among other possible functions. Various detailed features can include storage of time stamped video on a circular buffer for display of a retroactive moment in time, high value zoom using an on-board camera to digitally capture a user perspective at a much higher resolution than the human eye, digital enhancement and optical display of captured images to the user using the digital display, a personal flashlight using on-device flash LEDs to project light out for a hands-free light word on face, and/or touch strip access around edges of the device for on-device control of user interface, among other possible features.

Although various embodiments disclosed herein discuss the provided augmented reality device as a monocle, it will be readily appreciated that the disclosed features, apparatuses, systems, and methods can similarly be used for any relevant device or system having multiple devices or views. For example, two monocles may be used in a given arrangement, with both monocles coupling to eyewear of a user to provide cameras and virtual images for each eye of the user. Other applications, arrangements, and extrapolations beyond the illustrated embodiments are also contemplated. It will be understood that reference herein to a monocle can also refer to such other devices and systems using other augmented reality device arrangements.

Referring first to FIG. 1, an example augmented reality device according to one embodiment of the present disclosure is illustrated in front elevation view. Augmented reality device (i.e., "monocle") 100 can generally include a clip 110 or other coupling component, a camera 120, and an outer housing 130. Clip 110 can be used to couple monocle 100 to eyewear or another item worn by a user. Camera 120 can capture images of that which is being seen by the user. Outer housing 130 can be at least partially transparent, such that the user is able to look therethrough to see real life environments.

Figure 2A:
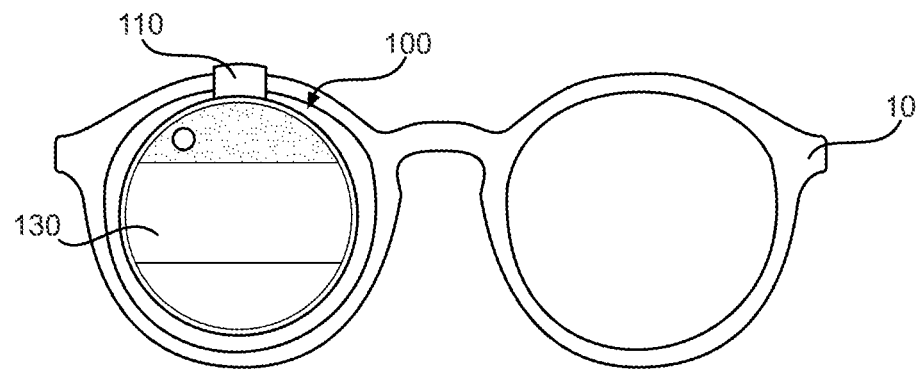
FIG. 2A illustrates in front elevation view the augmented reality device of FIG. 1 coupled to user eyewear according to one embodiment of the present disclosure.
Figure 2B:
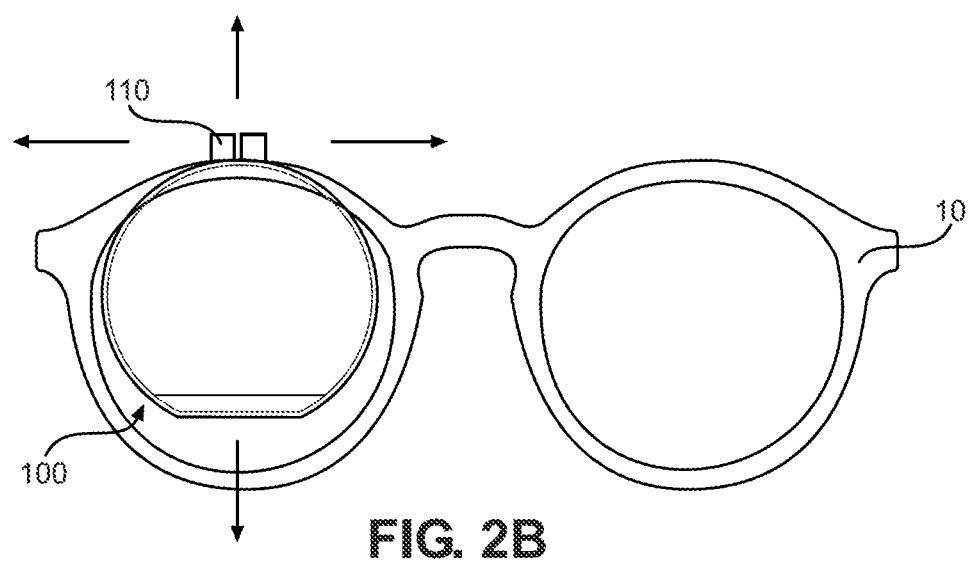
FIG. 2B illustrates in front elevation view possible positioning of the augmented reality device of FIG. 1 relative to user eyewear according to one embodiment of the present disclosure.

Continuing with FIG. 2A, the augmented reality device of FIG. 1 is shown in front elevation view as being coupled to user eyewear. As shown, monocle 100 can be clipped over the front user eyewear 10 by way of clip 110, such that the user can look through the eyewear (which is presumably transparent) and also the through monocle by way of transparent outer housing 130. FIG. 2B illustrates in front elevation view possible positioning of an augmented reality device relative to user eyewear. Again, clip 110 can be used to couple monocle 100 to user eyewear 10. As a part of monocle 100, clip 110 can allow the entire monocle to be positioned from side to side or up and down with respect to user eyewear 10 by simply sliding the entire monocle in the directions desired. In some arrangements, clip 110 can be over molded with a soft touch material, such as a thermoplastic elastomer, for example, which can securely couple monocle 100 to user eyewear 10 while preventing or limiting damage to the user eyewear.

Figure 3A:
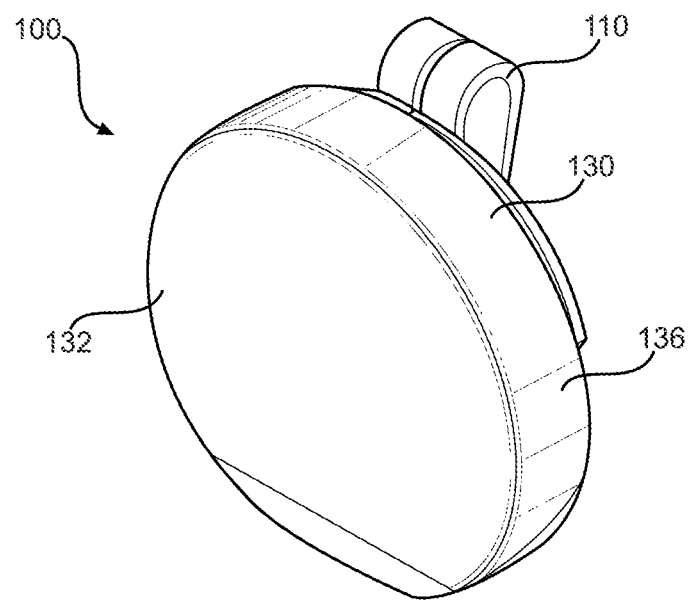
FIG. 3A illustrates in front perspective view an example augmented reality device according to one embodiment of the present disclosure.
Figure 3B:
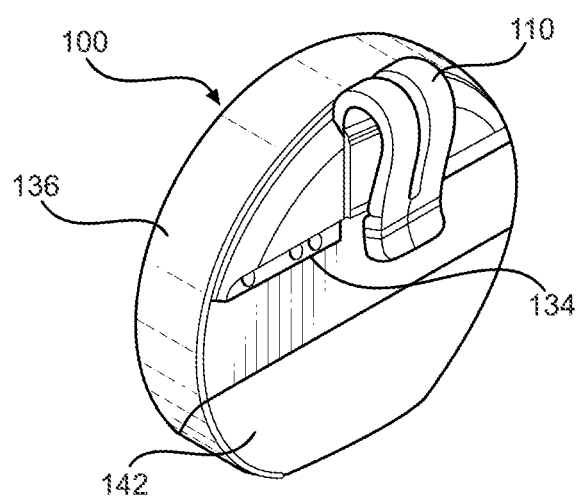
FIG. 3B illustrates in rear perspective view the augmented reality device of FIG. 3A according to one embodiment of the present disclosure.
Figure 3C:
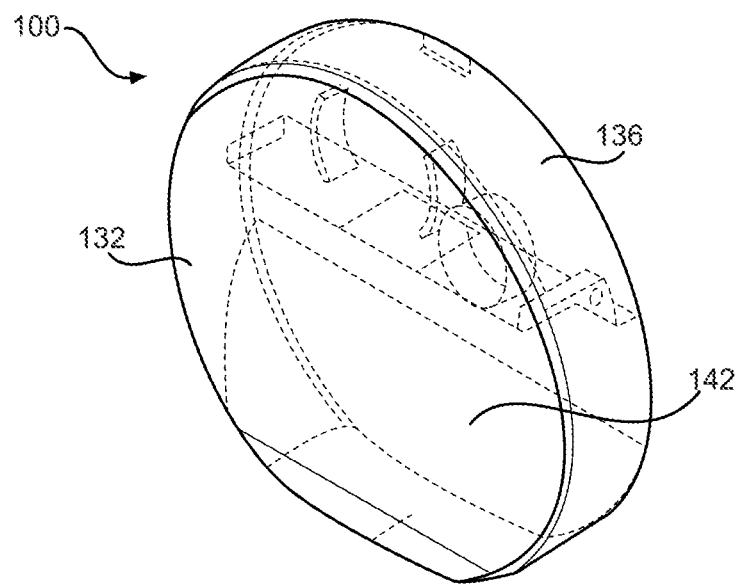
FIG. 3C illustrates in front perspective view the augmented reality device of FIG. 3A showing internal components according to one embodiment of the present disclosure.
Figure 3D:
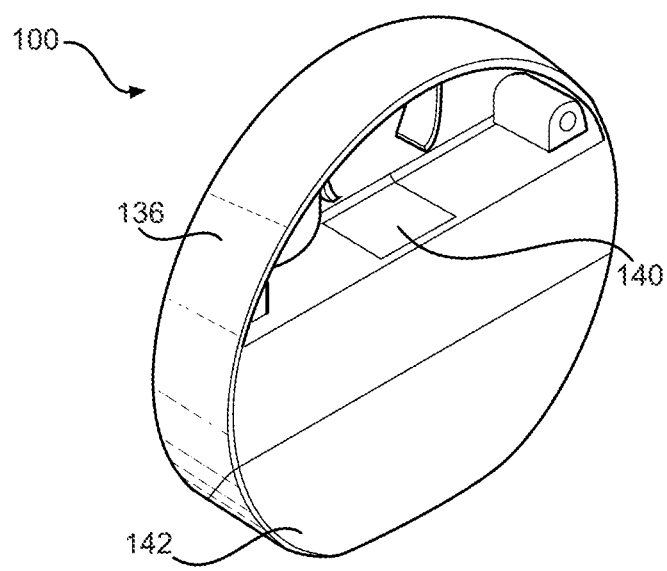
FIG. 3D illustrates in rear perspective view the augmented reality device of FIG. 3A with the back outer housing removed according to one embodiment of the present disclosure.
Figure 3E:
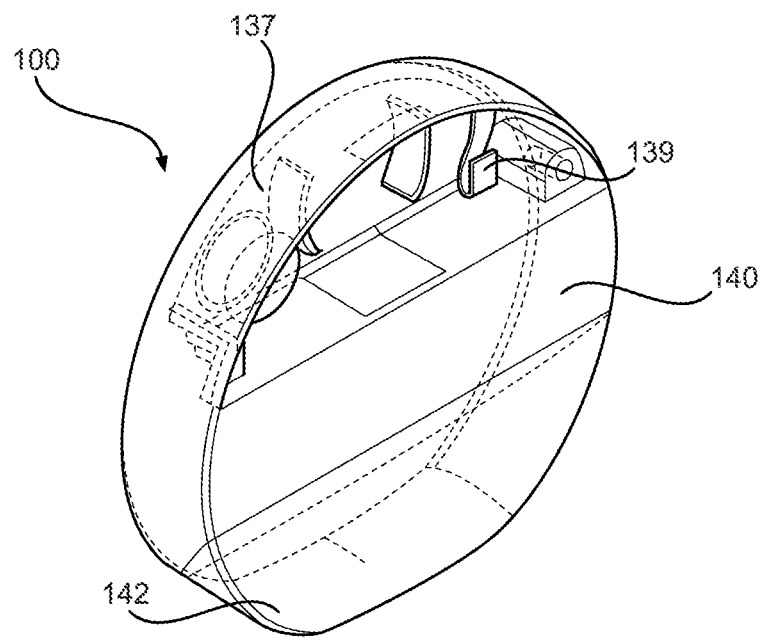
FIG. 3E illustrates in rear perspective view the augmented reality device of FIG. 3A with the back outer housing removed and showing internal components according to one embodiment of the present disclosure.
Figure 3F:
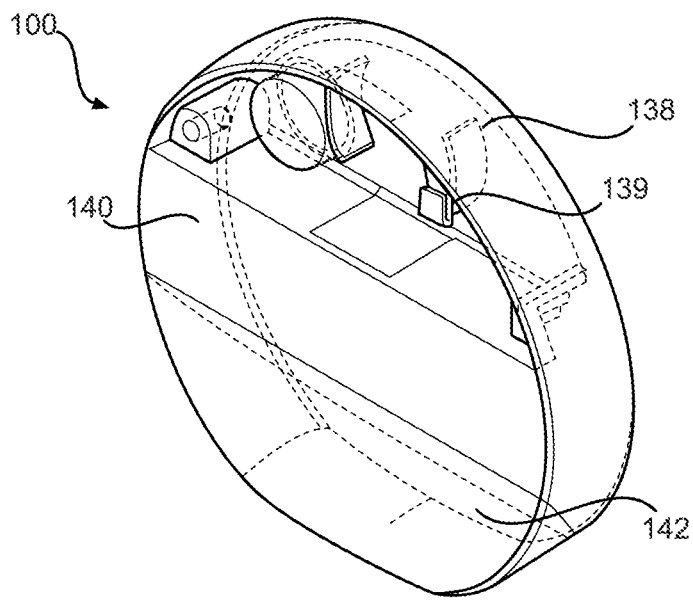
FIG. 3F illustrates in reverse rear perspective view the augmented reality device of FIG. 3A with the back outer housing removed and showing internal components according to one embodiment of the present disclosure.

Turning next to FIGS. 3A through 3F, an example augmented reality device (i.e. monocle) 100 is shown in various views. FIGS. 3A and 3B depict monocle 100 in front perspective and rear perspective views respectively. FIG. 3C shows monocle 100 in front perspective view showing internal components, while FIG. 3D depicts the monocle in rear perspective view with the back outer housing removed. FIGS. 3E and 3F illustrate monocle 100 with the back outer housing removed and showing internal components in rear perspective and reverse rear perspective views respectively. As shown in these various views, monocle 100 can generally include several major components, which can include a unibody top prism 140, a unibody bottom prism, 142, an outer housing 130, and a clip 110.

Outer housing 130 can include at least an outer housing front 132, an outer housing back 134, and an outer housing side and top 136, among other possible outer housing components. Outer housing front 132 and outer housing back 134 can define parallel planes, can be transparent or translucent, and can be arranged to allow a user to see therethrough, as will be readily appreciated. Outer housing 130 can also include a left side touch surface 137 on the left side of the monocle and a right side touch surface 138 on the right side of the monocle. Touch surfaces 137, 138 can be configured to accept user inputs, such as by a user touching or pressing on the touch surfaces. Alternatively, a button or other pushed component could be used in place of such touch surfaces 137, 138. One or more touch sensor flex cables 139 can be configured to communicate user inputs from one or both touch surfaces 137, 138 to an onboard processor within monocle 100.

Figure 4A:
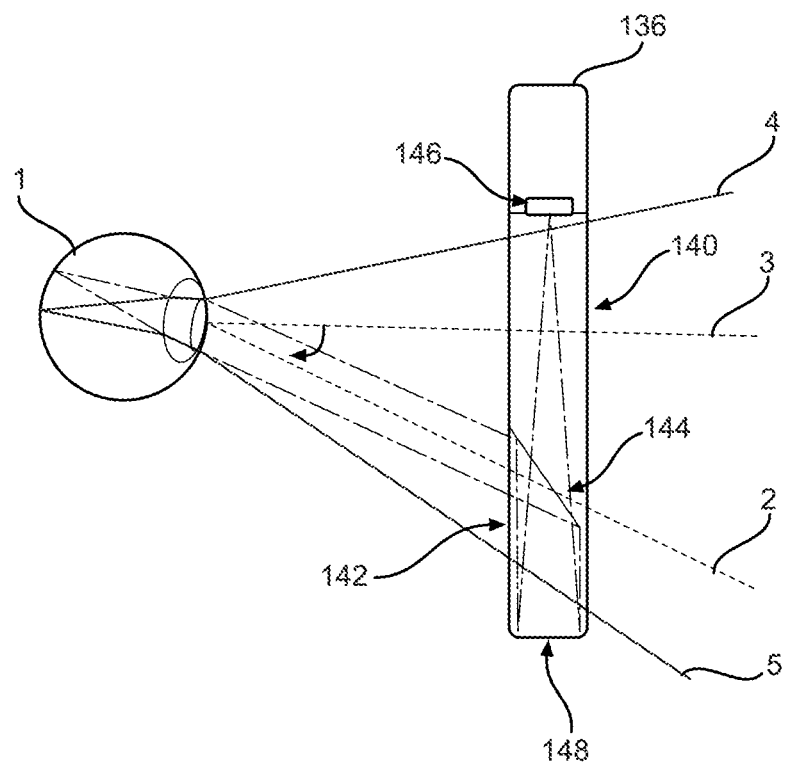
FIG. 4A illustrates a schematic diagram of a side view of a user looking through an example augmented reality device having a prism optical arrangement according to one embodiment of the present disclosure.

Transitioning to FIG. 4A, a schematic diagram of a side view of a user looking through an example augmented reality device having a prism arrangement is provided. In various arrangements, the disclosed monocle or augmented reality device can have a unibody prism that can have two parts coupled together. Unibody top prism 140 can be bonded or otherwise coupled to unibody bottom prism 142. Unibody top prism 140 can function both as a prism for device optics and a housing area for various internal electronic components, while unibody bottom prism 142 can function with unibody top prism 140 to provide virtual images for a user of the monocle in a unique manner.

The disclosed monocle or augmented reality device can use a reflective optical surface in conjunction with a folding prism to collect and project light from an optical display onto the retina of a user in a manner to provide a virtual display that is non-invasive with respect to being able to see real life objects in the environment of the user.

In various arrangements, the monocle can generally have two primary light paths with respect to the eye 1 of a user. A first light path 2 can be an optical display path for a virtual image. Light forming a virtual image can be projected into an optical prism 140, 142 from a micro-display or other optical display device 146 located within an upper housing 136 region downward past a combining optic 144, which can be a 50/50 dielectric material, for example. The virtual image along first light path 2 can then be directed toward a projecting optic 148, which can be spherical and have a reflective coating, such as an aluminum coating, for example. The virtual image along first light path 2 can then be collected at the projecting optic 148 and projected back up toward the combining optic 144 where the virtual image along first light path 2 is then redirected toward the user eye 1, where it can enter the user pupil and be focused on the user retina, as shown.

A second light path 3 can be a "see-through" or real object view path, which can be generated from the real life environment of the user. Second light path 3 can pass directly through the front and back flat surfaces of the optical prism 140, 142 unimpeded for a real object view to enter into the user eye and be focused on the user retina. In various embodiments, the virtual image display can be projected along first light path 2 at a downward angle slightly below the normal forward glancing vision of the user such that the virtual image display does not impede the normal vision of the user viewing real objects along second light path 3. As will be readily appreciated, the overall field of view of the user can have an upper bound or limit 4 and a lower bound or limit 5, and both the first light path 2 and the second light path 3 can fall within this overall field of view of the user.

Figure 4B:
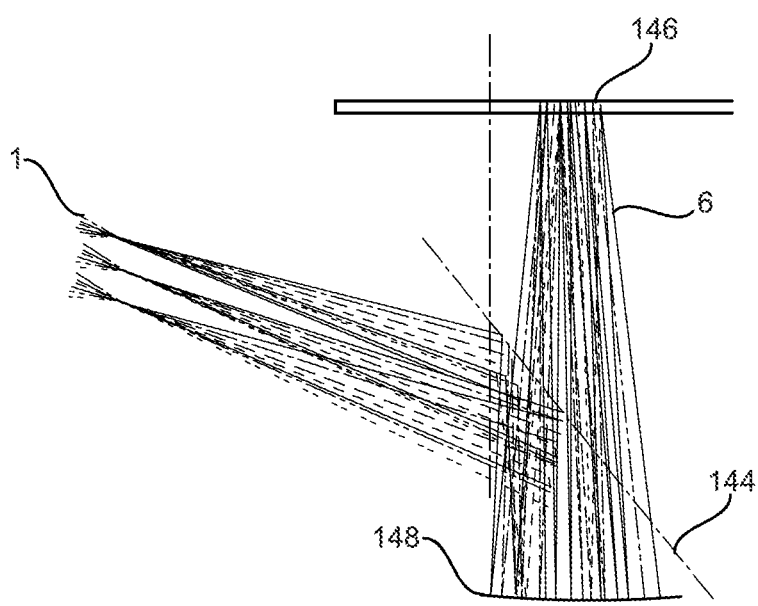
FIG. 4B illustrates a schematic diagram of light paths present in the augmented reality device of FIG. 4A according to one embodiment of the present disclosure.

FIG. 4B illustrates a schematic diagram of light paths present in the augmented reality device of FIG. 4A according to one embodiment of the present disclosure. Again, light 6 can be projected from an optical display 146, past combining optic 144, reflected off projecting optic 148 back to the combining optic, where it is then combined and directed toward user 1 as a virtual image 6. Various adjustments to the optical display 146, combining optic 144, projecting optic 148, and/or other optics components can be made to focus the final image for the user 1 in a customized manner, as will be readily appreciated.

Figure 5A:
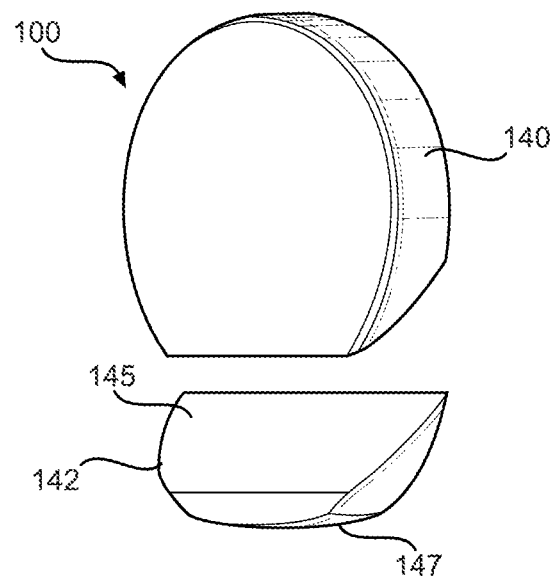
FIG. 5A illustrates in front perspective and partially exploded view an example augmented reality device according to one embodiment of the present disclosure.
Figure 5B:
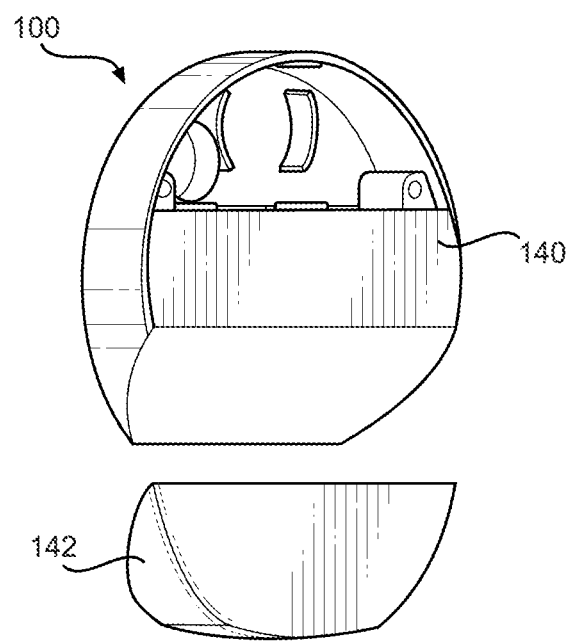
FIG. 5B illustrates in rear perspective and partially exploded view the augmented reality device of FIG. 5A with the back outer housing removed according to one embodiment of the present disclosure.

Continuing with FIGS. 5A and 5B an example augmented reality device with its back outer housing removed is illustrated in front perspective and partially exploded view and rear perspective and partially exploded view respectively. Again, monocle 100 can include a unibody top prism 140 and a unibody bottom prism 142 which can be bonded together in the finished monocle. A beam splitter 145 can be located along the top of unibody bottom prism 142 to split the projected light image before it is then combined by the combining optic. A reflection mirror 147 can be located along the bottom of unibody bottom prism 142 to reflect the projected light image back to the combining optic.

Figure 6:
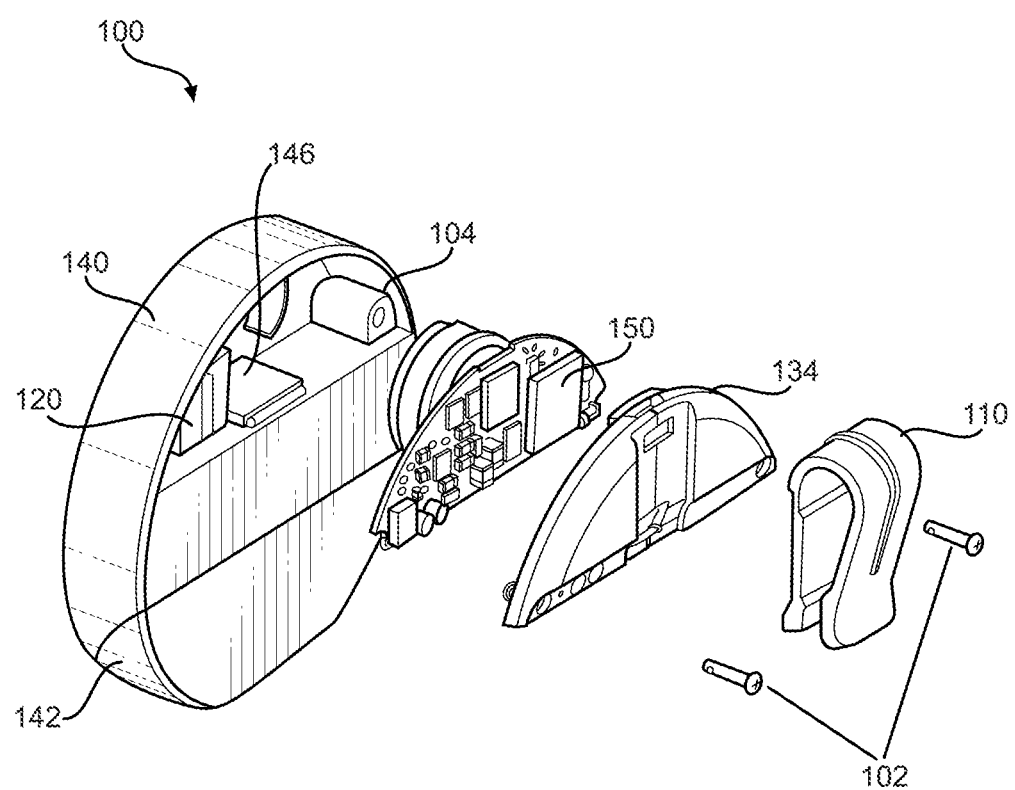
FIG. 6 illustrates in fully exploded view the augmented reality device of FIG. 5A according to one embodiment of the present disclosure.

FIG. 6 illustrates in fully exploded view the augmented reality device of FIG. 5A. As shown, monocle 100 can include a unibody top prism 140, a unibody bottom prism 142, an optical display device 146, a camera 120, a printed circuit board assembly 150, an outer housing back 134, and a clip 110, among various other components. One or more fasteners 102, which can be screws, for example, can fasten components together, such as through openings in outer housing back 134 and into mounting points 104 within unibody top prism 140. Again, unibody top prism 140 can house various electronic components, such as optical display device 146, camera 120, and printed circuit board assembly 150, which can include one or more processors and other electronic components. Optical display device 146 can be a micro-OLED, for example, although other types of display devices can be used.

Figure 7A:
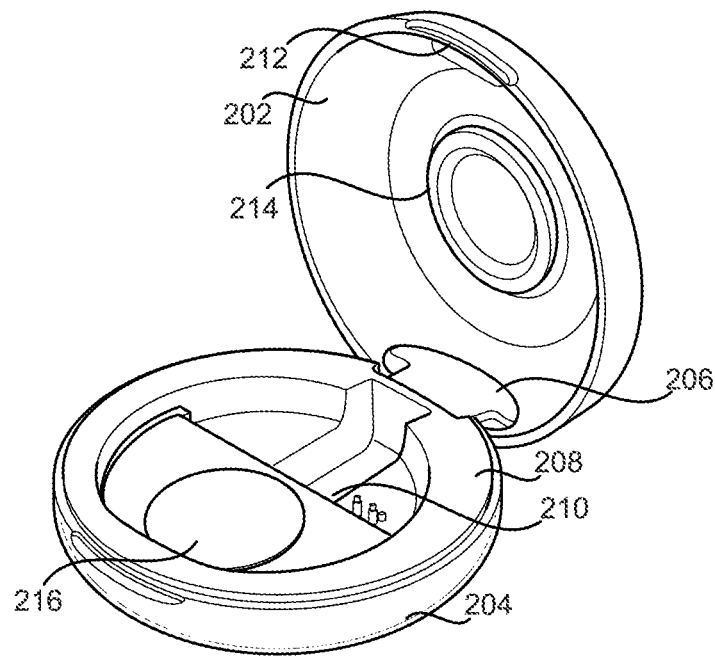
FIG. 7A illustrates in front perspective view an example charging case for an augmented reality device according to one embodiment of the present disclosure.
Figure 7B:
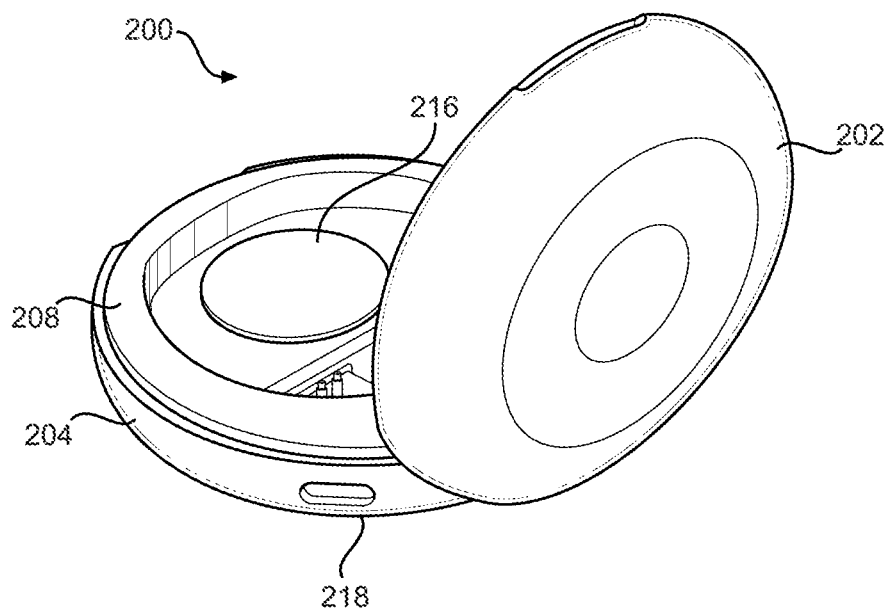
FIG. 7B illustrates in rear perspective view the charging case of FIG. 7A according to one embodiment of the present disclosure.
Figure 7C:
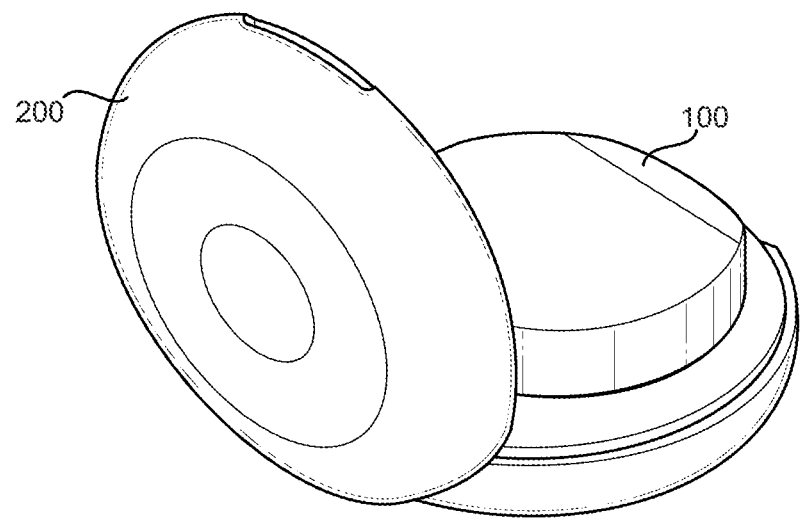
FIG. 7C illustrates in rear perspective view the charging case of FIG. 7A with an augmented reality device docked therein according to one embodiment of the present disclosure.
Figure 7D:
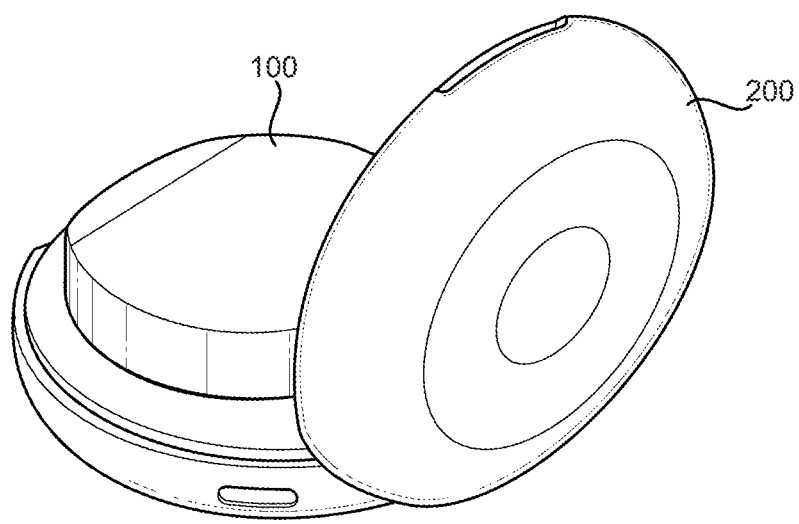
FIG. 7D illustrates in alternative rear perspective view the charging case and augmented reality device of FIG. 7C according to one embodiment of the present disclosure.
Figure 7E:
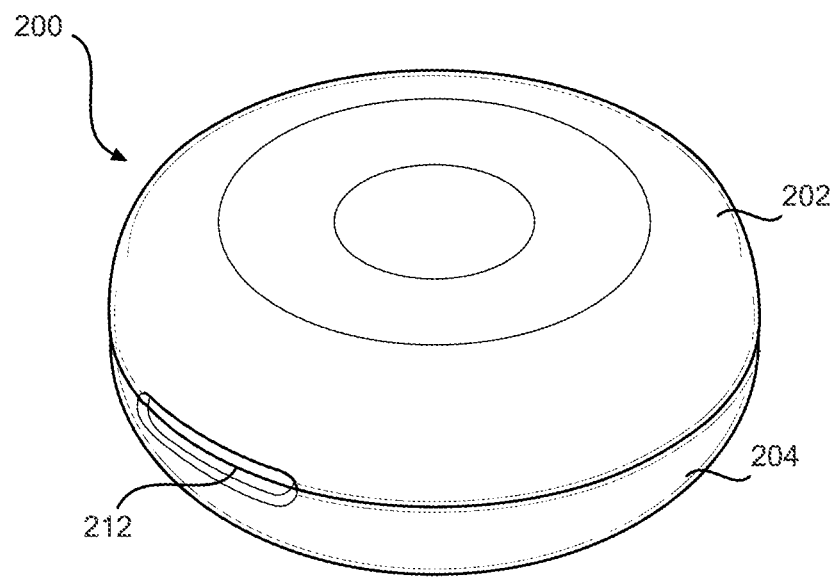
FIG. 7E illustrates in front perspective view the example charging case of FIG. 7A in a closed position according to one embodiment of the present disclosure.
Figure 7F:
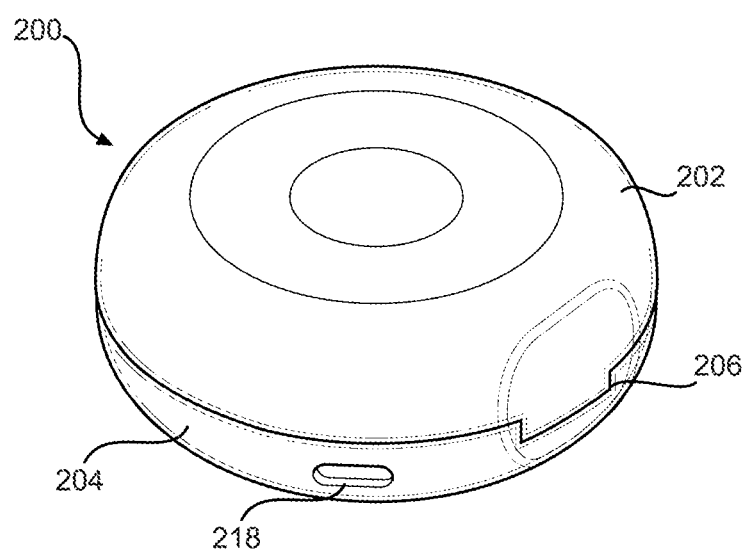
FIG. 7F illustrates in rear perspective view the example charging case of FIG. 7A in a closed position according to one embodiment of the present disclosure.

Moving next to FIGS. 7A-7F, an example charging case for an augmented reality device is shown in various views. FIGS. 7A and 7B depict charging case 200 in front perspective and rear perspective views respectively. FIGS. 7C and 7D illustrate charging case 200 with an augmented reality device 100 docked therein in rear perspective and alternative rear perspective views respectively. FIGS. 7E and 7F show charging case 200 in a closed position in front perspective and rear perspective views respectively.

Charging case 200 can have a lid 202 and a base 204, which can be coupled by way of a hinge 206 or other suitable coupling arrangement. Base 204 can carry a tray 208, which tray can be sized and shaped to contain a monocle or other augmented reality device therein. Lid 202, base 204, and tray 208 can be formed from molded plastic material, for example, although other types of materials can be used. In various arrangements, lid 202 can be connected to base 204 and tray 208 by way of pins, which can be formed from steel, for example.

One or more pogo pins 210 or other suitable electrical connectors can be located within base 204, and these pogo pins can be configured to electrically couple to a monocle docked within charging case 200 in order to charge the monocle. A magnet 212 located on lid 202 can facilitate locking the case closed when the lid is placed against base 204. A top silicone sticker 214 or another soft component can be located on an under side of lid 202, while a bottom silicone sticker 216 or another soft component can be located within tray 208. These silicone stickers 214, 216 or other soft components can function to protect a docked monocle from scratches or other damage.

A communications port 218 can be located on an outer surface of base 204 and can facilitate communications with an outside device. For example, an outside computer, phone, tablet or other device can be coupled to communications port 218 in order to communicate with a monocle or other augmented reality device docked within charging case 200. Communications port 218 can be a USB-C port, for example, although other types of ports can also be used. Charging case 200 can also include a battery, such as a lithium-ion rechargeable battery, for example, although other types of batteries may also be used. The battery can charge a docked monocle or other augmented reality device by way of pogo pins 210. In some arrangements, the monocle or other augmented reality device can be held in place by magnets when docked.

In some arrangements, charging case 200 can function simply as a battery, such as to recharge a docked monocle or other augmented reality device. In other arrangements, charging case 200 can be more active and provide additional functions. For example, charging case 200 can be configured to receive images stored on a docked monocle and store them to a separate memory, such as an SD card. Charging case 200 can also be plugged into a computer, smart phone, or other computing device by way of communications port 218, such that images can be taken from a docked monocle and stored to the other computing device.

In various arrangements, charging case 200 may also be configured to accept user inputs, such as through one or more buttons, touchpads, IMU or other haptic feedback sensors, and/or other types of user input components. Wireless communications with outside devices may also be possible and wired connections may transfer data as well as provide power, such that extended operation of the charging case and docked monocle may be possible.

Figure 8:
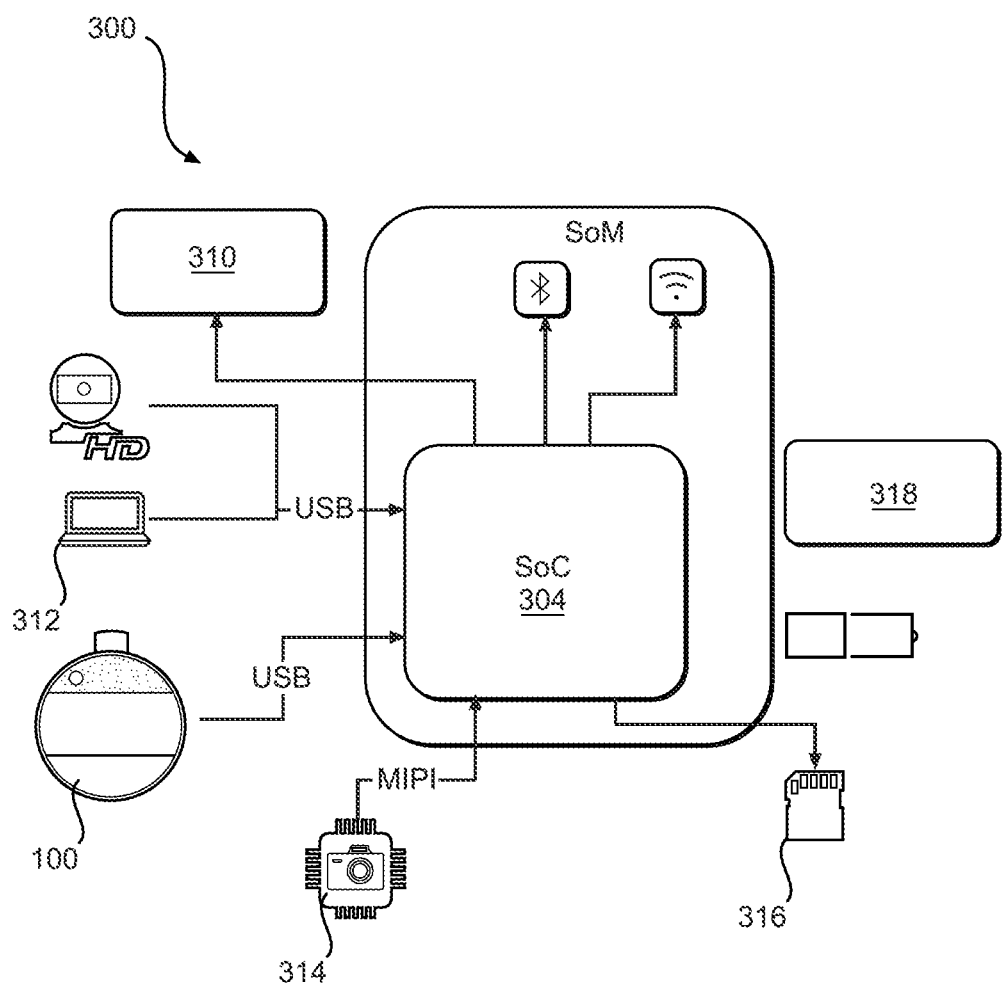
FIG. 8 illustrates a schematic diagram of an example electronic system having an augmented reality device according to one embodiment of the present disclosure.

Transitioning next to FIG. 8, a schematic diagram is provided of an example electronic system having an augmented reality device. Electronic system 300 can include various components related to monocle 100. A primary system-on-module 302 can include a system-on-chip 304 having various communications connections to different system components. Such communications connections can include various wireless connections, such as, for example, Bluetooth and Wifi, as well as various wired connections, such as, for example, USB, MIPI, and the like. Different system components can include monocle 100, one or more outside processors 310, one or more outside computers 312, one or more other cameras 314, one or more outside storage devices 316, which can be used to store various buffer clips, and one or more outside input devices 318, among other possible components.

Figure 9A:
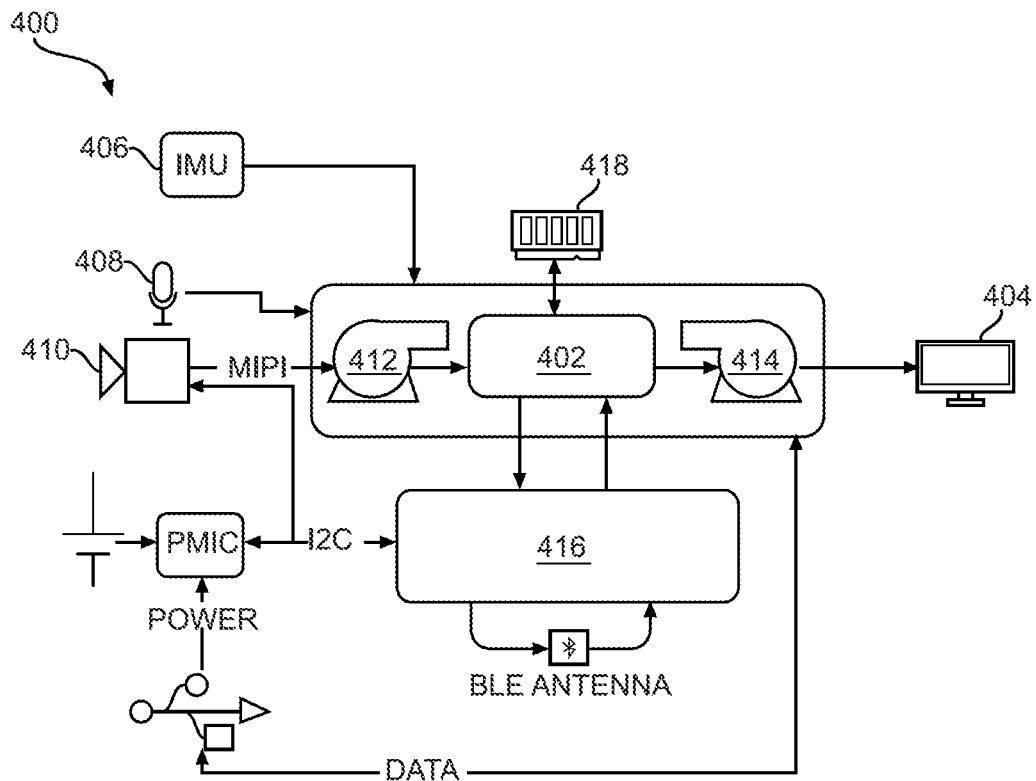
FIG. 9A illustrates a schematic diagram of an example traffic manager and software module arrangement of an electronic system having an augmented reality device according to one embodiment of the present disclosure.

FIG. 9A illustrates a schematic diagram of an example traffic manager and software module arrangement of an electronic system having an augmented reality device. Arrangement 400 can include a traffic manager 402, which can receive inputs from a variety of devices and provide outputs to one or more devices, such as an OLED display 404. OLED display can correspond to optical display device 146 on monocle 100 above. A built in speaker (not shown) may also provide audio outputs in some arrangements. Inputs can include, for example, those coming from an inertial measurement unit ("IMU") 406, a microphone 408, and/or a camera 410 (which can correspond to camera 120 above), among other possible inputs.

Traffic manager 402 can be located on the monocle or other augmented reality device, so as to minimize data transfer issues. As such, a compression module 412 feeding images, video and/or other data to traffic manager 402 and a decompression module 414 receiving images, video, and/or data from the traffic manager can also be located on the monocle itself. Traffic manager 402 can be in communication with a wireless communications module 416, which can be Bluetooth Low Energy ("BLE") enabled, for example. Wireless communications module 416 can also have its own processor, touch controller, and/or BLE antenna in some arrangements. One or more memory units 418, such as a UFS NAND flash memory can be coupled to traffic manager 402, and such memory units can also be located on the monocle device itself.

Figure 9B:
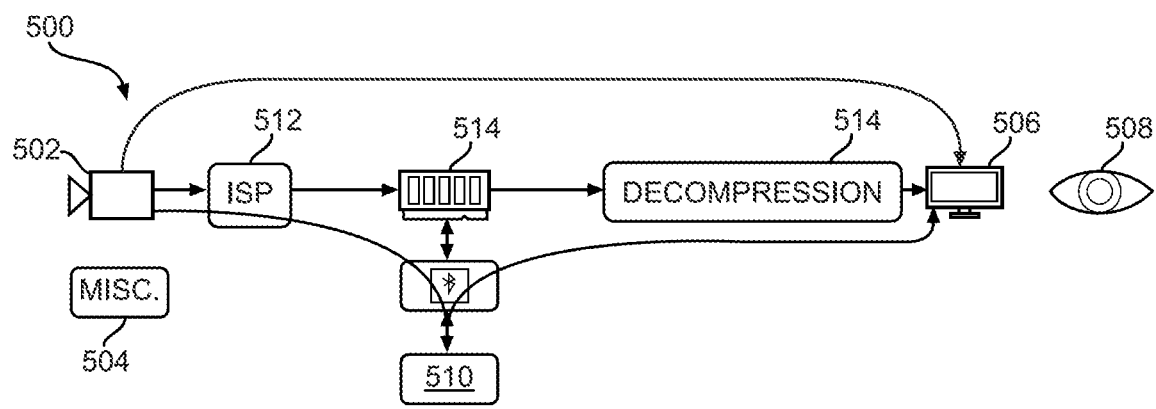
FIG. 9B illustrates a schematic diagram of an example communications arrangement for an electronic system having an augmented reality device according to one embodiment of the present disclosure.

FIG. 9B illustrates a schematic diagram of an example communications arrangement for an electronic system having an augmented reality device. Communications arrangement 500 can involve one or more inputs, such as images captured by a camera 502 and/or sound captured by a microphone 504, one or both of which can be located on a monocle or other augmented reality device. Such input(s) can be provided directly to a display 506 and/or speaker on the monocle for viewing and listening by a user 508. In addition, such input(s) can also be provided to one or more outside devices 510, such as a smart phone, computer, or the like. Transmission can be by way of an ISP 512 or other communications provider. Such input(s) can also be stored in one or more memory devices 514. All or any combination of these input provisions can take place simultaneously for the same input(s), and a decompressor 516 can be used for such input(s) as may be necessary.

In addition to the foregoing details, the disclosed monocle or other augmented reality device can have various other features. Where wired connections are used, a USB connection can facilitate communication with another device, such as another body worn device, for example, for power and/or data transfer. In addition to providing stored images and/or audio captured by the monocle, the monocle display can also show live video from the monocle camera, as well as video and/or audio from other sources. In addition, the display can include annotations or other indicators with respect to real life objects in the actual field of view.

In various arrangements, the monocle can have zoom, pan, and tilt features using the onboard camera, such that magnified real view images can be presented to the user, and these functions can be performed digitally and/or in analog. The monocle can also take single higher resolution pictures that are stored to local memory.

While ordinary buttons can be used, a touch sensitive user interface surface can also be used for tapping or sliding motions. For example, a slide motion along a touch sensitive user interface can be used to advance or rewinds a given image playback. Speed of slide motion can also affect the speed of advance or rewind on a given buffer clip. An onboard accelerometer or IMU can also be used as a user interface by capturing head movements or other user movements, and an onboard microphone can capture audio from the user and/or the user environment. The microphone and IMU may be used either in isolation or together to implement a tap-based gesture interface.

Figure 10A:
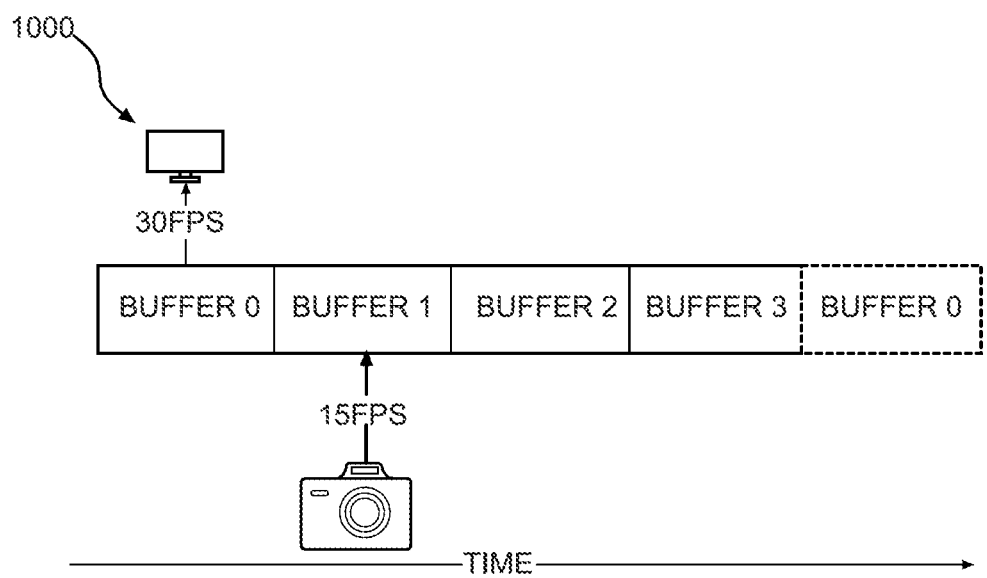
FIG. 10A illustrates a schematic diagram of an example buffer sequence for an augmented reality device according to one embodiment of the present disclosure.

FIG. 10A illustrates a schematic diagram of an example buffer sequence for an augmented reality device. In various embodiments, the disclosed monocle can capture visual images and/or audio and save those visual images and/or audio as media clips to one or more buffers stored on the monocle itself. The monocle can write and rewrite a constant circular replay buffer of video for a set amount of time, such as, for example 30 seconds. This process can be performed continuously and can take place automatically or at the command of the user. In some arrangements, the user can provide one or more inputs that instruct the monocle to save a particular buffer segment without rewriting over that buffer segment. Saved buffer segments can then be replayed on demand. Such demand can be made by way of one or more user inputs, such as, for example, a button push, use of an onboard IMU or touch sensitive interface, or a user gesture or voice command, as well as through an outside device, such as a smart phone, smart watch, computer, or the like. Each buffer can be stored temporarily or permanently on the monocle and can also be offloaded to an outside device.

Multiple buffers can be used to store various events. As shown in buffer sequence 1000, for example, a rotating sequence of four separate rewritable 30 second buffers can be used to temporarily store visual and/or audio data in real time as the user wears the monocle. If the user desires a particular sequence to be preserved, then a command can be given to store one or more buffer sequences to a kept memory location. If no such command is given, then each rewritable buffer can be written over with new data. Of course, more or fewer than four buffer segments can be used, and time lengths longer or shorter than 30 seconds can also be used. Captured images and/or audio can be streamed to the user as soon as may be practical, depending on remaining battery capacity and/or other operational factors.

Figure 10B:
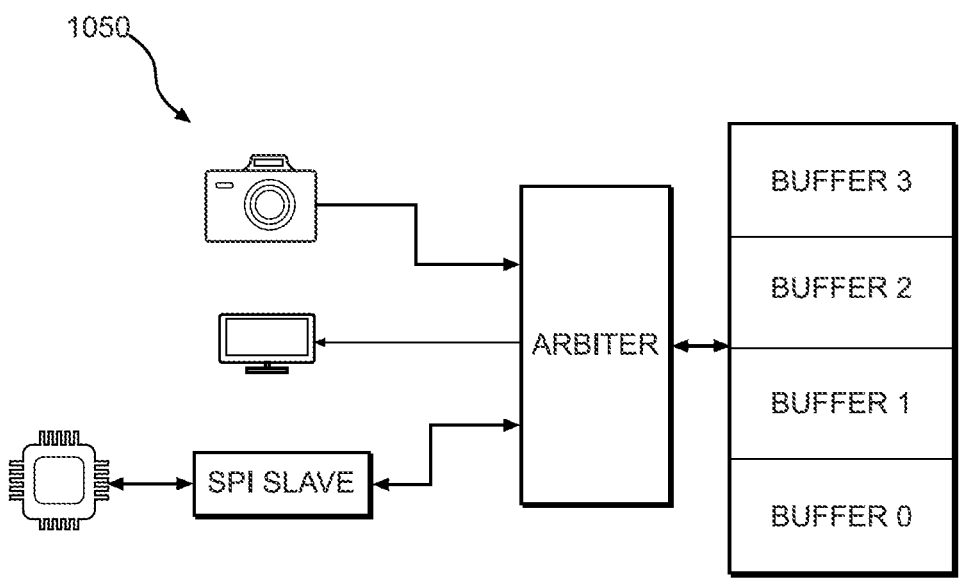
FIG. 10B illustrates a schematic diagram of an example buffer management arrangement for an electronic system having an augmented reality device according to one embodiment of the present disclosure.

FIG. 10B illustrates a schematic diagram of an example buffer management arrangement for an electronic system having an augmented reality device. Arrangement 1050 can include an arbiter or other processing component or module that controls the capturing and storing of visual image and/or audio inputs into different buffer segments. These buffer segments can be provided to an onboard monocle display, can be provided to an onboard monocle storage, or both. The arbiter can also control the rewriting of new material onto buffer segments, which can be rotated and overwritten.

Figure 11:
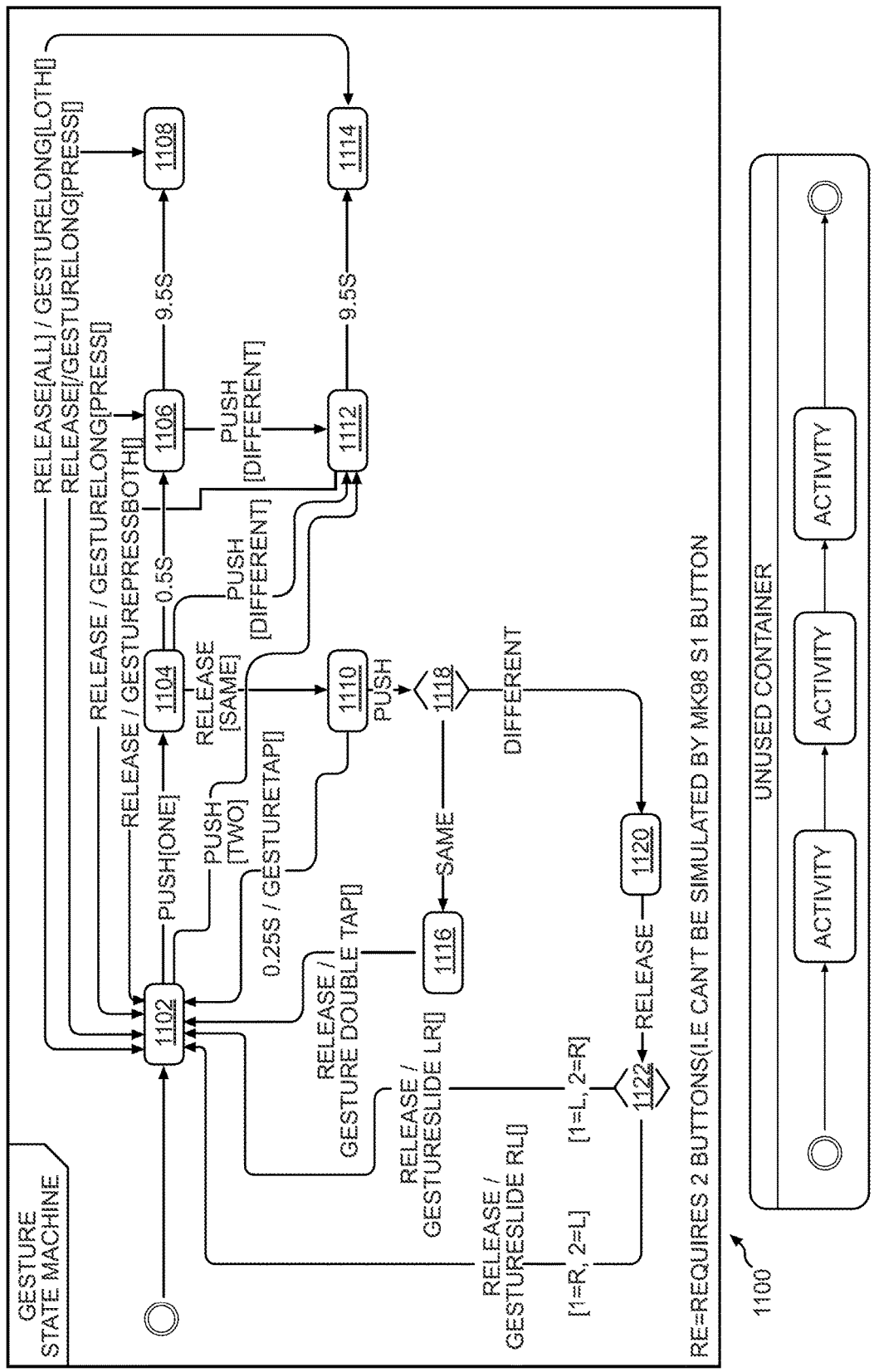
FIG. 11 illustrates a schematic diagram of an example gesture state processing arrangement for an augmented reality device according to one embodiment of the present disclosure.

FIG. 11 illustrates a schematic diagram of an example gesture state processing arrangement for an augmented reality device. Gesture state processing arrangement 1100 can include considerations for gesture states for a first input device (e.g., a button or touch surface) such as idle 1102, triggered 1104, pressed short 1106, and pressed long 1108. A certain amount of time, such as five seconds, for example, can separate each of these gesture states for the first input device. Gesture states for a second input device (e.g., a second touch surface) can include tapped 1110, both pressed 1112, and both pressed long 1114. An initial gesture state 1116 can involve whether either button or touch surface has been pressed or touched, upon which a gesture state inquiry 1118 can determine which button or touch surface has been pressed or touched. In various arrangements involving touch surfaces, a slid gesture state 1120 can also be used. A compare actuated buttons/touch surfaces gesture state 1122 may also be implemented.

Figure 12:
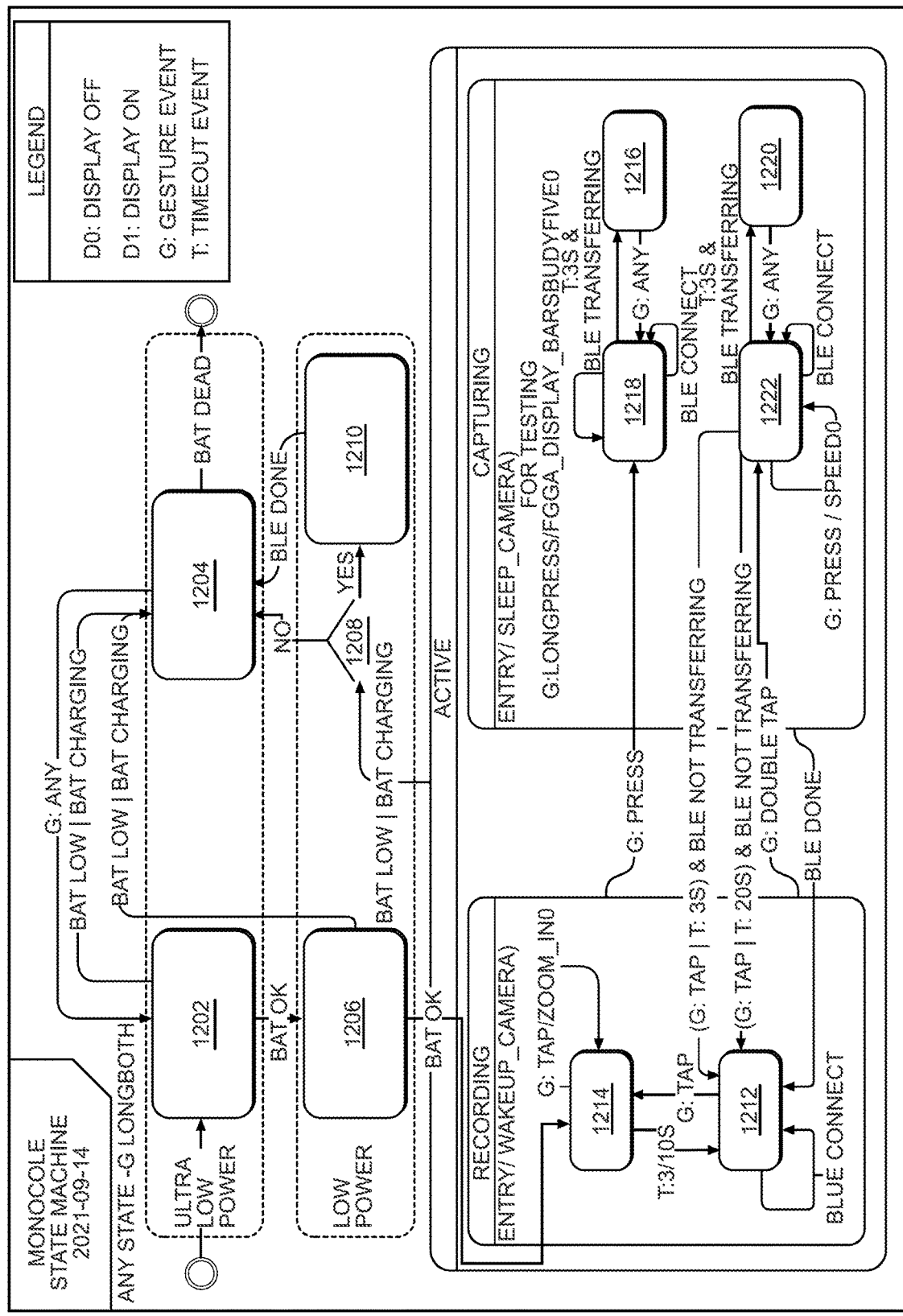
FIG. 12 illustrates a schematic diagram of an example state machine arrangement for an augmented reality device according to one embodiment of the present disclosure.

FIG. 12 illustrates a schematic diagram of an example state machine arrangement for an augmented reality device. The disclosed monocle can be a state device, and state machine arrangement 1200 can reflect various possible states for the monocle. An early initiation state 1202 can involve ultra-low device power situations, such as in the case of a low battery, which can then result in a powered down state 1204. A full initiation state 1206 can involve low device power situations, which can cause transfer 1208 of vital data or assets and result in a shutdown pending state 1210. Normal powered conditions can involve fully active device states within the realms of recording and capturing. Recording states can include a Record_D0 (home state) state 1212 and a Record_D1 state 1214. Capturing states can include a Photo_D0 state 1216 and a Photo_D1 state 1218. Capturing states can also include a Replay_D0 state 1220 and a Replay_D1 state 1222.

Various example methods of operation for an augmented reality device will now be provided. It will be understood that the methods provided here are examples for purposes of illustration, and that many variations and other methods of use are also possible for the disclosed augmented reality devices and systems.

Figure 13:
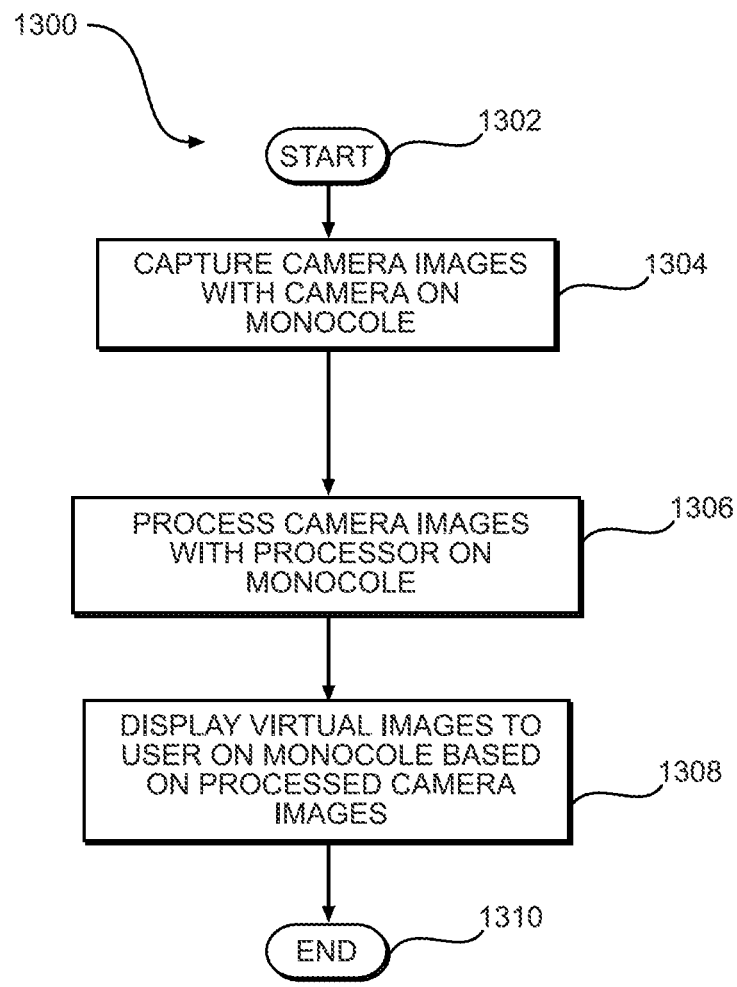
FIG. 13 illustrates a flowchart of an example method of operating an augmented reality device according to one embodiment of the present disclosure.

FIG. 13 illustrates a flowchart of an example method of operating an augmented reality device. In various embodiments, method 1300 can be applied using the various systems, devices, and features provided above. Some or all of the steps of method 1300 can be automatically performed, such that the entire method can be considered a computer-implemented method in some arrangements.

After a start step 1302, a first process step can involve capturing camera images on the monocle or other augmented reality device. As noted above, this can be accomplished using a camera that is located on or within the monocle itself. Capturing images on the monocle can take place automatically, as a result of one or more user inputs, or both.

At a following process step 1306, the captured camera images can be processed using a processor on the monocle or other augmented reality device. Such a processor can be located within an outer housing of the monocle, such as within a unibody top prism region. Camera image processing can involve altering the images, organizing the images, such as into buffer segments, and/or storing the images, among other possible image processing functions.

At the next process step 1308, virtual images can be displayed to a user on the monocle or other augmented reality device based on the processed camera images. Displaying the virtual images can involve projecting the processed camera images through an optical system located within the monocle, as detailed above. Again, the display of virtual images can be done in a manner that does not impede the ability of the user to view the real life user environment. For example, the virtual image display can be along a light path that is separate from a straight ahead real life view path, such as downward from the straight ahead view path or in another direction within the peripheral view of the user. The method then ends at end step 1310.

It will be appreciated that the foregoing method 1300 may include additional steps not shown, and that not all steps are necessary in some embodiments. For example, additional steps may include providing the monocle or other augmented reality device, communicating with one or more outside electronic devices, or stopping the display of virtual images. Other process steps can involve focusing the virtual images in a customized manner for the user or speeding up or slowing down the display of virtual images, among other possible actions. Furthermore, the order of steps may be altered as desired, and one or more steps may be performed simultaneously. For example, process steps 1304-1308 can all be performed simultaneously, which may take place on the same or different images.

Figure 14:
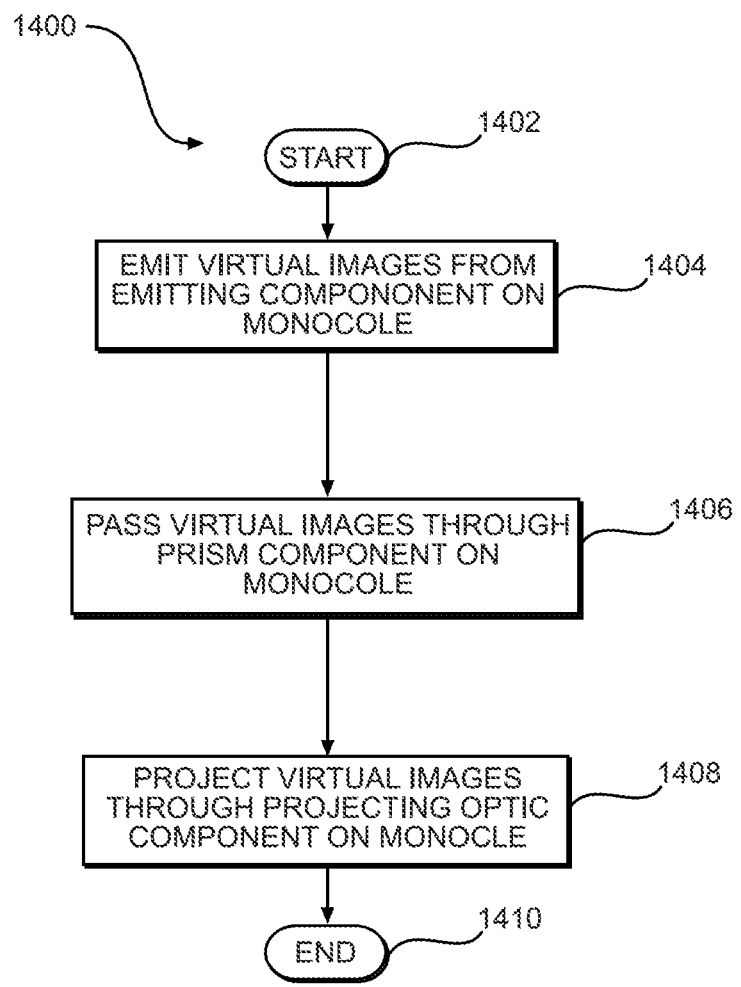
FIG. 14 illustrates a flowchart of an example method of displaying virtual display images on an augmented reality device according to one embodiment of the present disclosure.

Next, FIG. 14 illustrates a flowchart of an example method of displaying virtual display images on an augmented reality device. In various embodiments, method 1400 can be applied using the various systems, devices, and features provided above. Some or all of the steps of method 1400 can be automatically performed, such that the entire method can be considered a computer-implemented method in some arrangements. In various embodiments, all of method 1400 can be considered a detailed process of step 1308 in method 1300 above.

After a start step 1402, a first process step 1404 can involve emitting virtual images from an image emitting component located on the monocle or other augmented reality device. Again, this can be a micro-display or other optical display device located within an upper housing region of the monocle. In some arrangements, the virtual images can be emitted downward from the image emitting component to other optical components within the monocle.

At the next process step 1406, the virtual images can be passed through a prism component located on the monocle or other augmented reality device. As noted above, such a prism component can be a folding prism having a top prism component and a bottom prism component bonded together to form a unibody prism.

At a following process step 1408, the virtual images can be projected through a projecting optic component located on the monocle or other augmented reality device. Again, such a projecting optic can be spherical and can have a reflective coating, such as an aluminum coating, for example. The method then ends at end step 1410.

It will be appreciated that the foregoing method 1400 may include additional steps not shown, and that not all steps are necessary in some embodiments. For example, additional steps may include passing the virtual images past a combining optic on a first pass, and then collecting the images at the combining optic after they have been projected through the projecting optic. The virtual images can then be redirected from the combining optic to the eye of the user. The order of steps may be altered as desired, and one or more steps may be performed simultaneously. For example, process steps 1404-1408 can all be performed simultaneously during a continuous displaying of virtual images.

Figure 15:
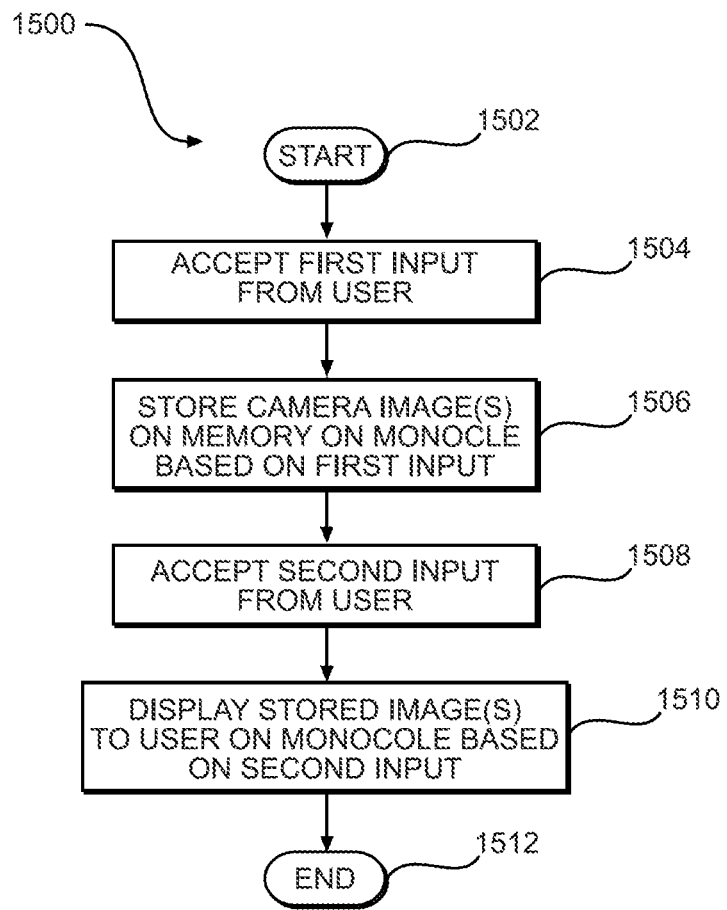
FIG. 15 illustrates a flowchart of an example method of operating an augmented reality device based on user inputs according to one embodiment of the present disclosure.

Finally, FIG. 15 illustrates a flowchart of an example method of operating an augmented reality device based on user inputs. In various embodiments, method 1500 can be applied using the various systems, devices, and features provided above. Some or all of the steps of method 1500 can be automatically performed, such that the entire method can be considered a computer-implemented method in some arrangements. In various embodiments, method 1500 can be considered in addition to method 1300 or method 1400 above, and it will be readily appreciated that some processes may include all steps from all of methods 1300, 1400, and 1500.

After a start step 1502, a first process step 1504 can involve accepting a first input from a user of the monocle or other augmented reality device. Such a first user input can be any of a variety of inputs. Possible user inputs can include, for example, a button push on the monocle, a voice command, a gesture, user motion (which may be detected by an internal accelerometer), and/or various possible inputs on an outside device in communication with the monocle, such as a computer, smart phone, smart watch, charging case, or the like. Other user inputs are also possible.

At a following process step 1506, one or more camera images can be stored in a memory located on the monocle or other augmented reality device based on the first user input. Such camera images can be organized and stored in one or more buffers in the onboard memory. In some arrangements, additional camera image storage can take place in one or more memory devices located outside the monocle as well. Such additional storage can involve the same camera images stored in the onboard memory, different camera images, or both.

At the next process step 1508, a second input can be accepted from the user. Again, such a second user input can be any of a variety of user inputs, as listed above for process step 1504. Second user input can be the same type of user input for the first user input, or it can be a different type of user input. For example, the first user input can be a voice command and the second user input can be a button push on the monocle. Other combinations of user inputs are also possible, and it is contemplated that all such combinations may be used.

At subsequent process step 1510, the one or more stored images can be displayed to the user on the monocle or other augmented reality device based on the second user input. The displayed images can be provided by way of the optical arrangement detailed above, and the user can view the displayed images by looking toward them. For example, the displayed images can be shown within the monocle at an angle that is slightly below a straight ahead viewing angle, such that the user can simply look downward within the monocle to see the displayed images. The method then ends at end step 1512.

Similar to foregoing methods 1300 and 1400, it will be appreciated that method 1500 may include additional steps not shown, and that not all steps are necessary in some embodiments. For example, additional steps may include accepting a third user input that affects the manner in which the displayed images are provided. Such a third user input might control the zoom level, display angle, playback speed, and/or other aspects of the displayed images. The order of steps may be altered as desired, and one or more steps may be performed simultaneously. For example, process steps 1506 and 1510 can be performed simultaneously during a continuous process of storing and displaying various images.

FIGS. 16A-16F illustrate views of an example augmented reality device according to one embodiment of the present disclosure. According to this embodiment, a frame type augmented reality device allows a user to wear the augmented reality device 1600 similar to a pair of glasses. The augmented reality device 1600 includes a frame body (e.g., a frame housing) 1602, a clear camera cover 1603, a first arm (e.g., an arm housing) 1604, a second arm (e.g., an arm housing) 1606, a first processor coupled to the printed circuit board 1608, a camera 1610, an optical display (e.g., a Micro OLED) 1612, a steel reinforcement bracket 1613, a first lens optical element (non-prism optical lens) 1614, a second lens optical element 1616, a combiner prism optical element (beam splitter combiner) 1618 which has a spherical reflective surface 1619, charging pads 1620, a rear housing 1622, a first battery 1624, and a second battery. A rear housing element 1632 is configured for attachment to a rear portion of the frame body 1602. The rear housing element 1632 comprises charging pads or connectors 1621. The reinforcement bracket 1613 is positioned in an internal area of the frame body 1602, and a camera module holding the camera 1610 is affixed thereto. In some embodiments, the augmented reality device 1600 includes a microphone for obtaining audio signals. The augmented reality device may include a storage device storing data such as textual data, image files, video files and/or audio signals. The augmented reality device 1600 may perform any of the processes or methods as described herein as to the augmented reality device 100.

The wearable augmented reality device 1600 includes a frame comprising a frame body 1602. A first arm 1604 is hingedly attached to the frame body 1602. A second arm 1606 is hingedly attached to the frame body 1602. A hinge assembly 1609 connects an arm to the frame body 1602 via a hinge 1607. In some embodiments, the first arm 1604 and second arm 1606 are configured such that the arms 1604, 1606 when folded are substantially parallel to each other. For example, the hinges 1607 of the first arm and/or second arm may be configured to provide a degree of offset (e.g., 3-15 degrees) between the first and the second arms. The hinge assembly 1609 has an opening in a portion of the hinge assembly 1609 allow wiring to be disposed therethrough. In some embodiments, the hinge assembly may be snapped into the frame body and held in place via ridges and/or grooves along a top and bottom portion of the assembly. The frame body 1602 has internal groves and/or ridges corresponding to the ridges and/or grooves of the hinge assembly 1609.

This provides a degree of tilt ranging when the arm is folded toward the frame body 1602. The first arm 1604 and/or the second arm 1606 may include a battery compartment 1601 in distal end of the arm. For example, in some embodiments, a first battery 1624 and a second battery 1626 provides power to the first processor and other electronic components of the augmented reality device 1600. In some embodiments, the first processor is positioned in the frame body in an internal area adjacent to a nose bridge of the frame body.

A printed circuit board 1608 may include the camera 1610, a first processor and wireless communication circuitry for wireless communication with a controller device. The printed circuit board 1608 is attached to a reinforcement bracket 1613. The bracket is placed in the frame body 1602. This allows the camera 1610 to be positioned in a front portion of the frame body 1602. The lens or camera sensor 1610 is protected by the camera cover 1603 which is disposed on the front portion of the frame body 1602.

The first processor is positioned in the frame body 1602 and allows for the control and operation of the augmented reality device 1600. The first processor may provide and receive instructions to/from other components of the augmented reality device 1600.

In some embodiments, the frame body 1602 includes a first lens optical element 1614 and a second lens optical element 1616. The first lens optical element 1614 and the second lens optical element 1616 may be made of an optical material, such as optical grade plastic, plyethylene, Trivex, polycarbonate, high-index polymers, or glass. In some embodiments, the first lens optical element is a solid optical lens without a combiner prism optical element.

In some embodiments, an optical display device 1612 is positioned in a top portion of the frame body 1602. For example, in some embodiments the optical display device is a micro-OLED. The optical display device 1612 projects a display of pixelated colored light into the second lens optical element 1616. The second lens optical element 1616 includes a notch or cutout portion 1620 where a combiner prism optical element 1618 is positioned. The combiner prism optical element 1618 may be seated in the notch or cutout portion 1620, with an adhesive or other type of bonding agent.

Figure 16A:
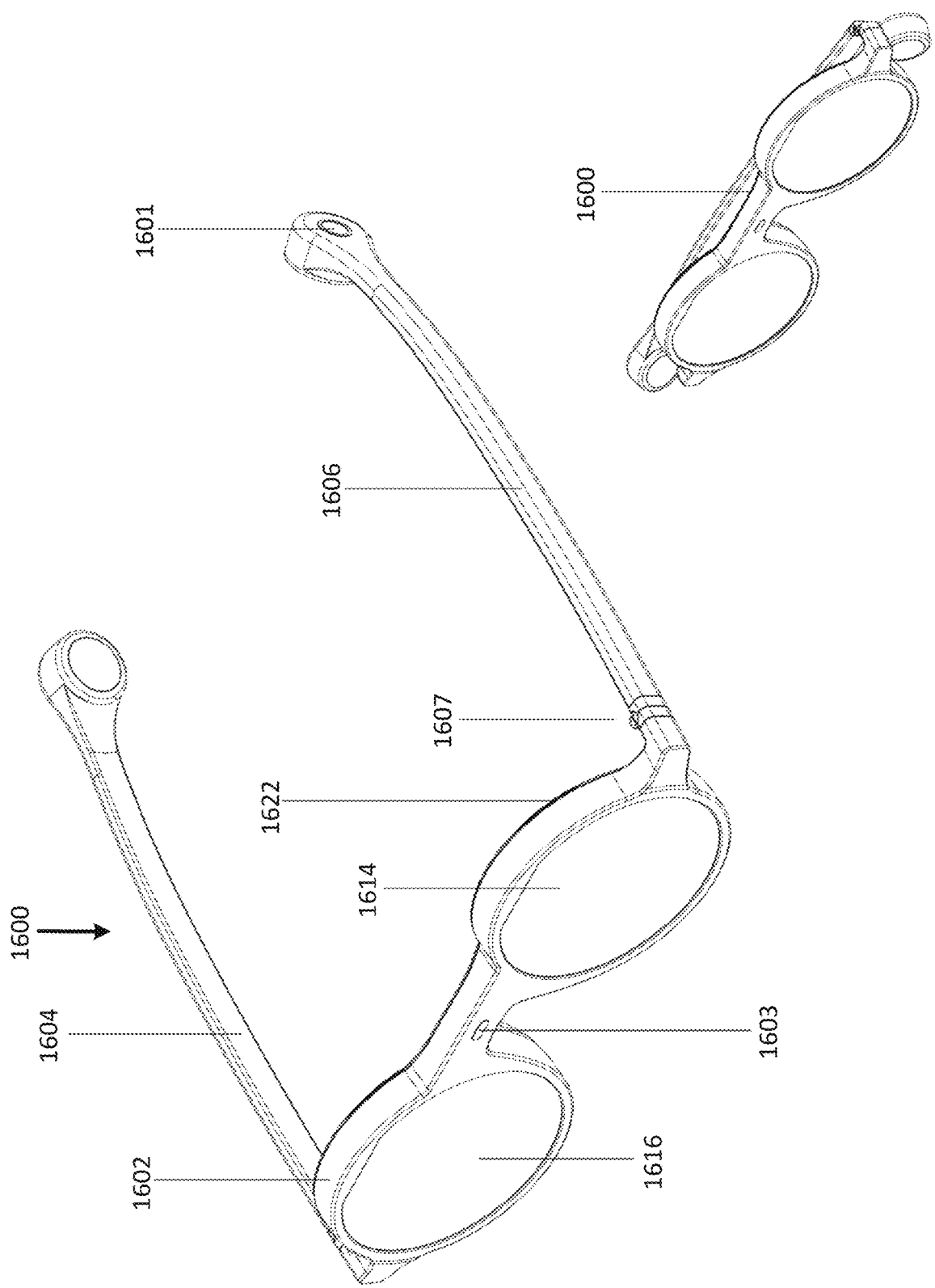
FIGS. 16A-16J illustrate views of an example augmented reality device according to one embodiment of the present disclosure.
Figure 16B:
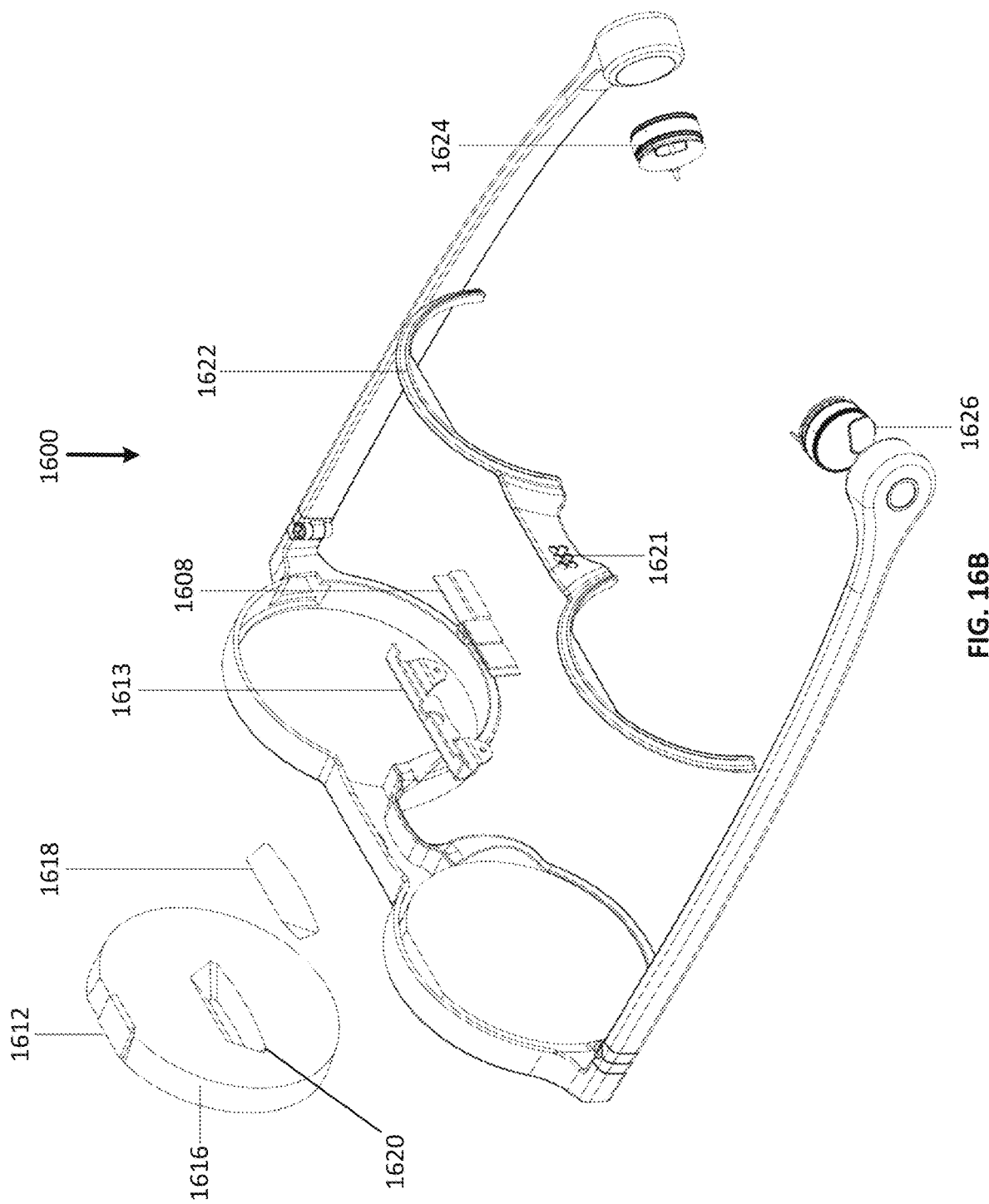
Figure 16C:
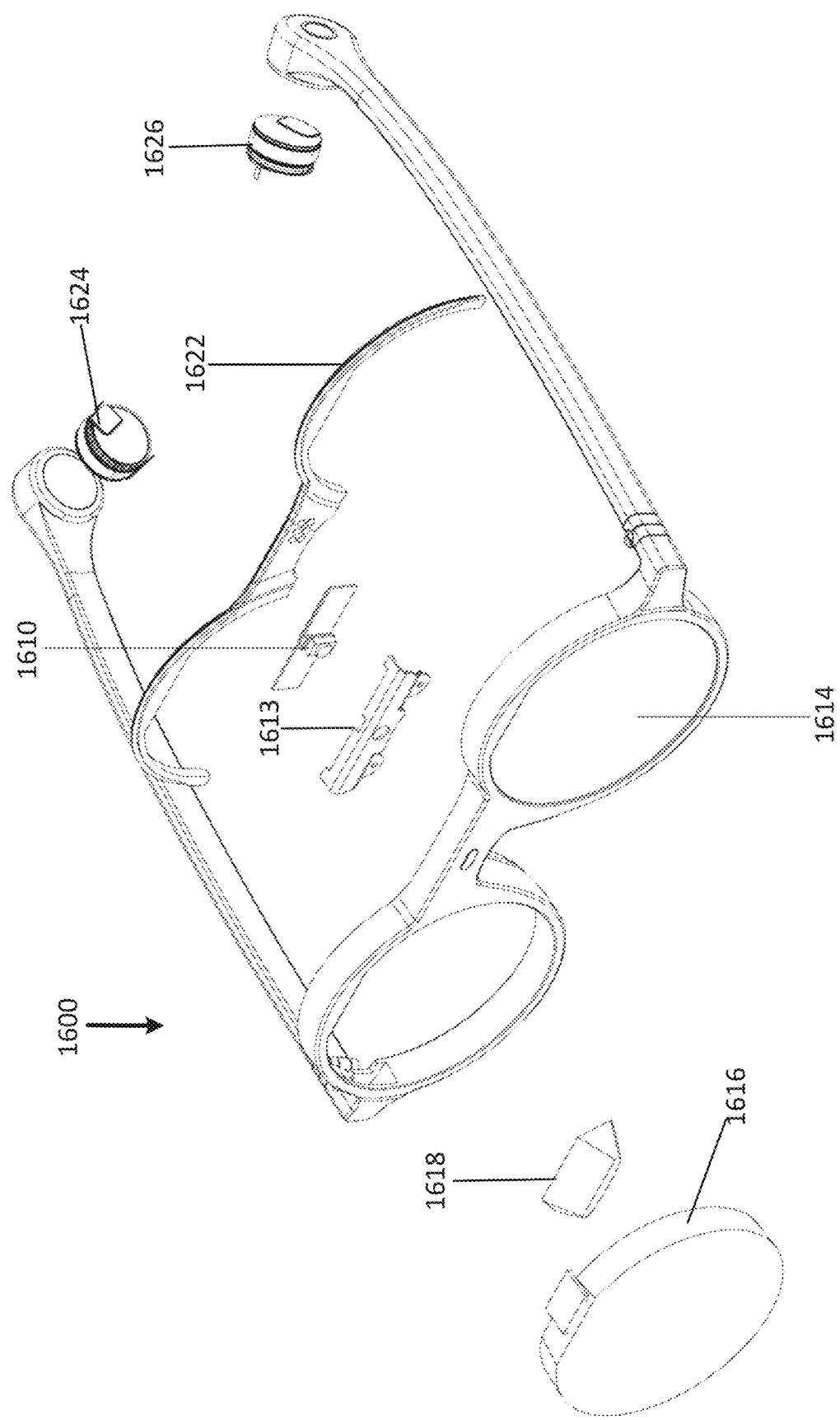
Figure 16E:
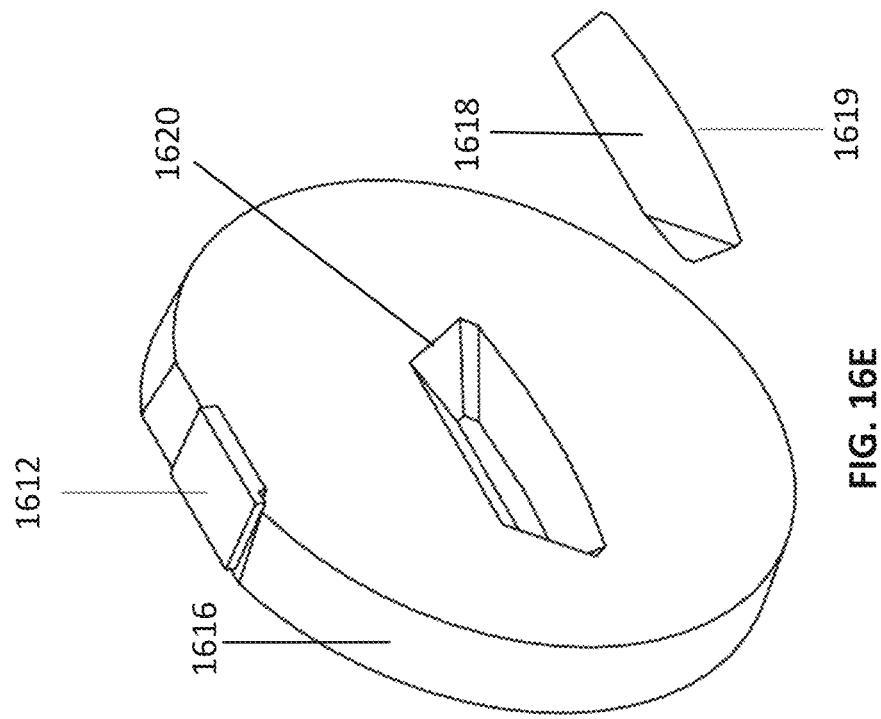
Figure 16D:
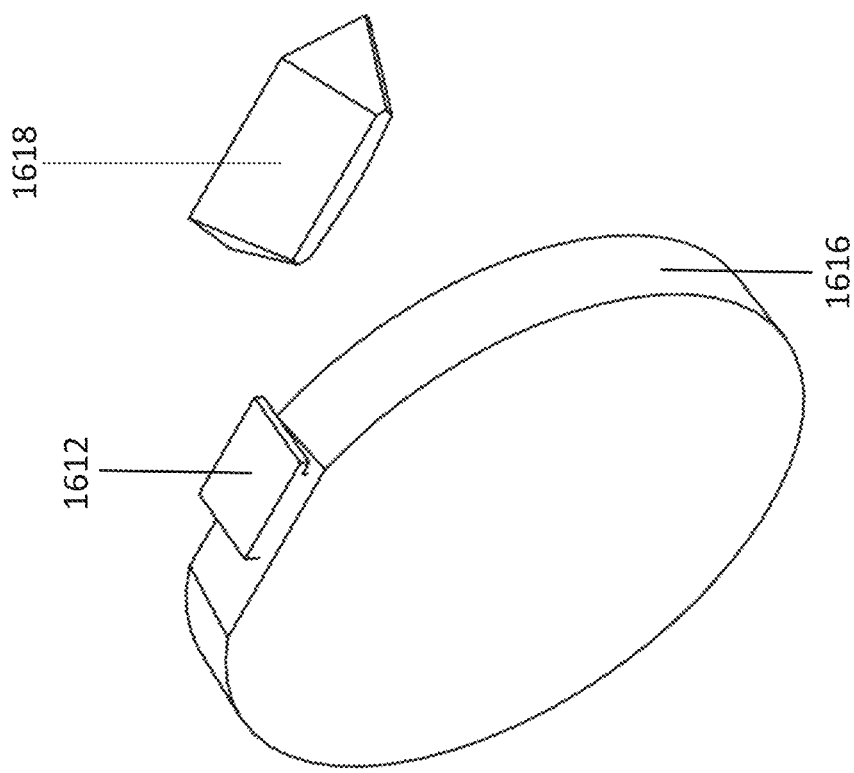
Figure 16F:
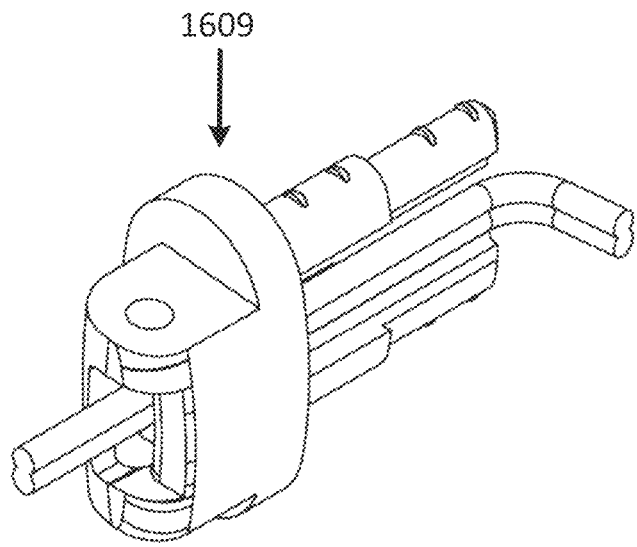
Figure 16G:
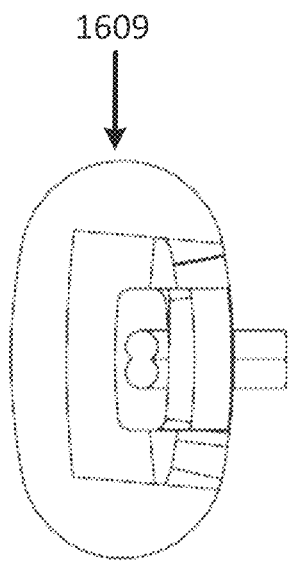
Figure 16H:
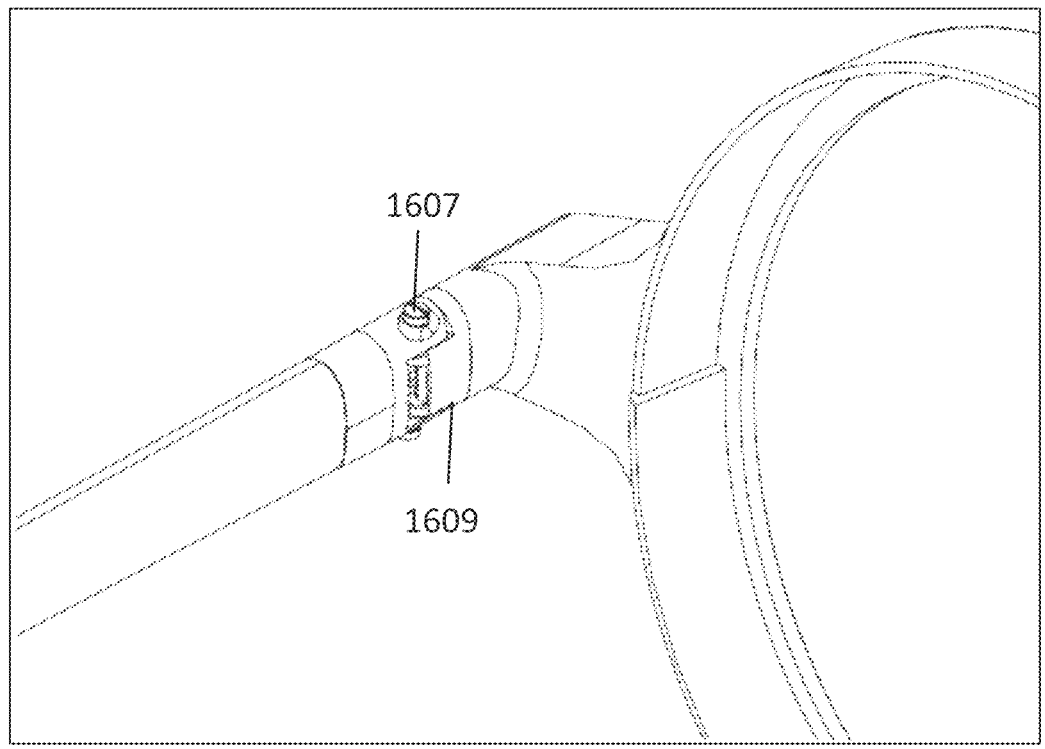
Figure 16I:
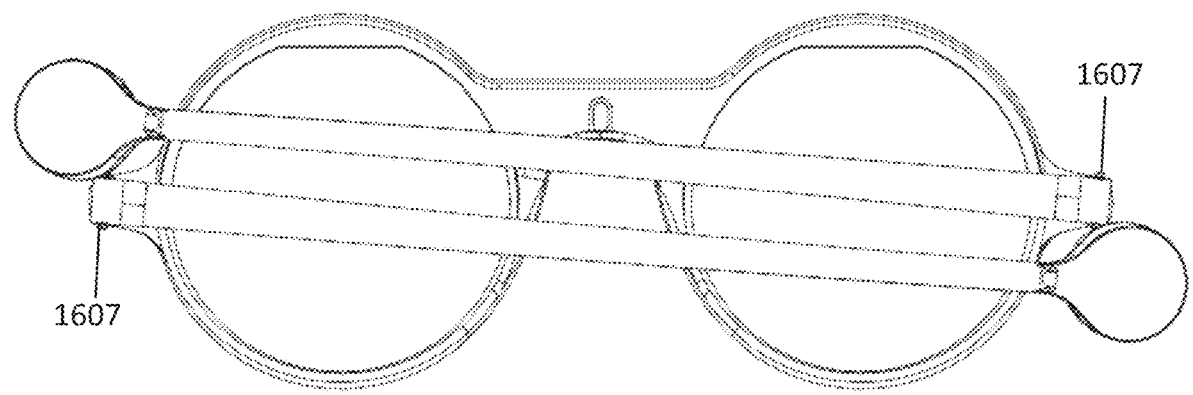
Figure 16J:
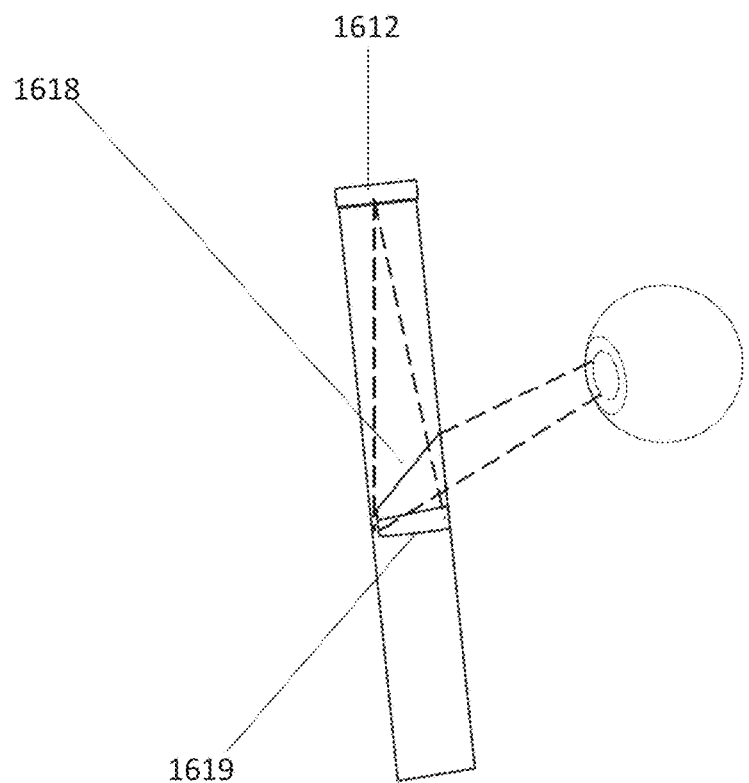
Figure 16L:
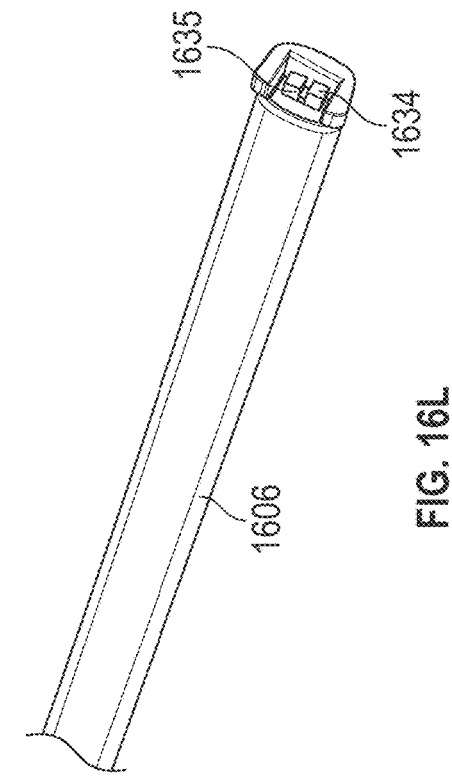
FIGS. 16K-16N illustrate views of an example arm assembly according to one embodiment of the augmented reality device as depicted in FIGS. 16A-F.
Figure 16N:
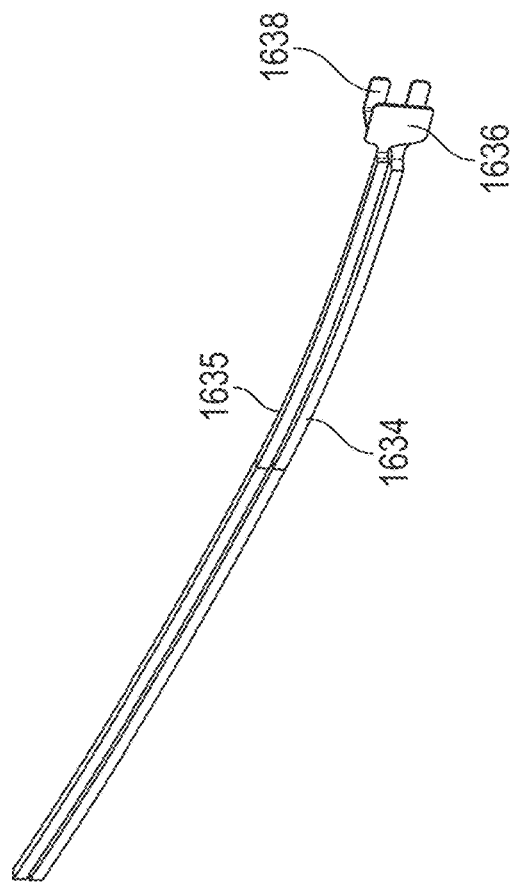

As illustrated in FIG. 16J, the combiner prism optical element 1618 is shaped and configured to allow light received from the optical display device 1612 to pass through a top portion of the combiner prism optical element 1618 and reflect off of a coated curved or spherical bottom surface 1619 of the combiner prism optical element 1618. Light is reflected back toward the eye of the wearer of the augmented reality device 1600. The reflection of light is similar to that illustrated with regard to FIGS. 4A-4B. The combiner prism optical element 1618 is shown positioned in the second lens optical element 1616. In some embodiments, the bottom portion of the combiner prism optical element 1618 has a coated and partially reflecting mirrored surface having the characteristics of a high reflection low incident angle and high transmission at high angles.

In some embodiments, the first processor of the augmented reality device 1600 is configured to perform operation that project image(s) or video from the optical display device 1612. For example, processed camera images may be projected towards the combiner prism optical element 1618 such that light emitted from the optical display device 1612 passes through a top portion of the second lens optical element 1616 and the combiner prism optical element 1618. The light is projected from the second lens optical element 1616 back toward the combiner prism optical element 1618, and then is reflected from a bottom portion 1619 of the combiner prism optical element 1618 towards a focused display position towards an eye of a wearer of the wearable augmented reality device 1600. Moreover, the processor is configured to move the focused display position by adjusting a position of the image being projected from the optical display device 1612 toward the combiner prism optical element 1618.

Figure 16K:
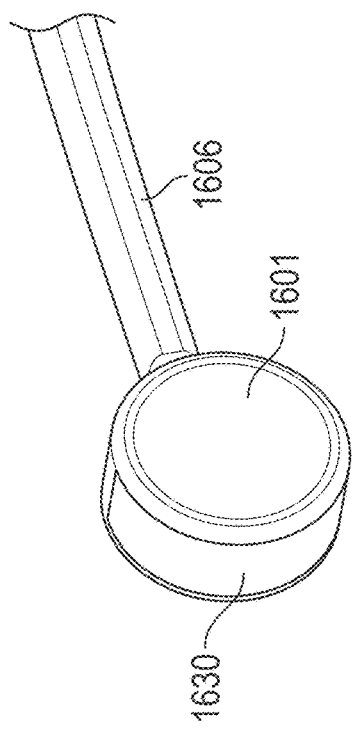
Figure 16M:
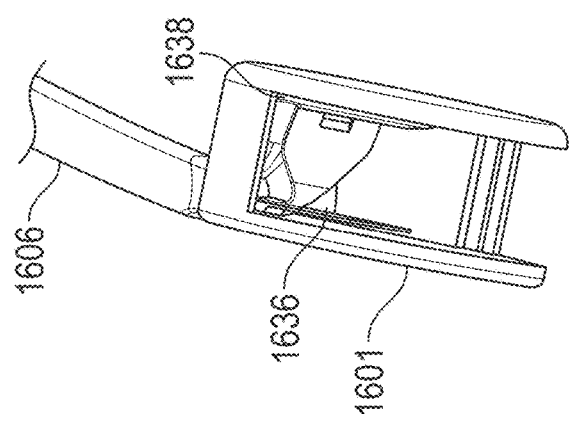
Figure 18A:
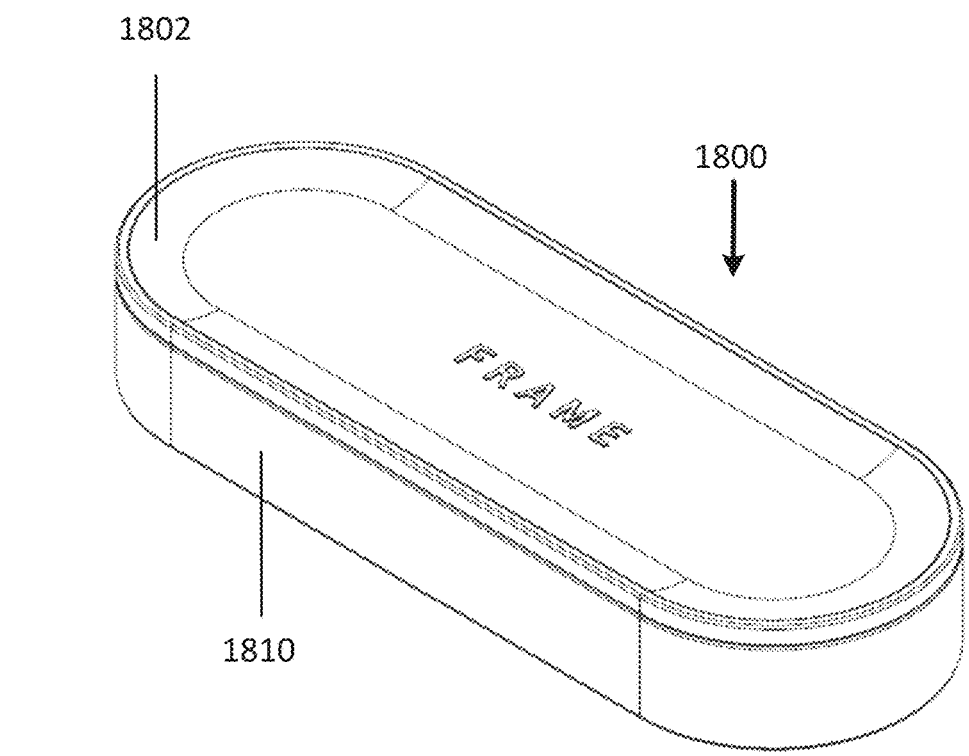
FIGS. 18A-18E illustrate views of an example case according to one embodiment of the present disclosure.
Figure 18B:
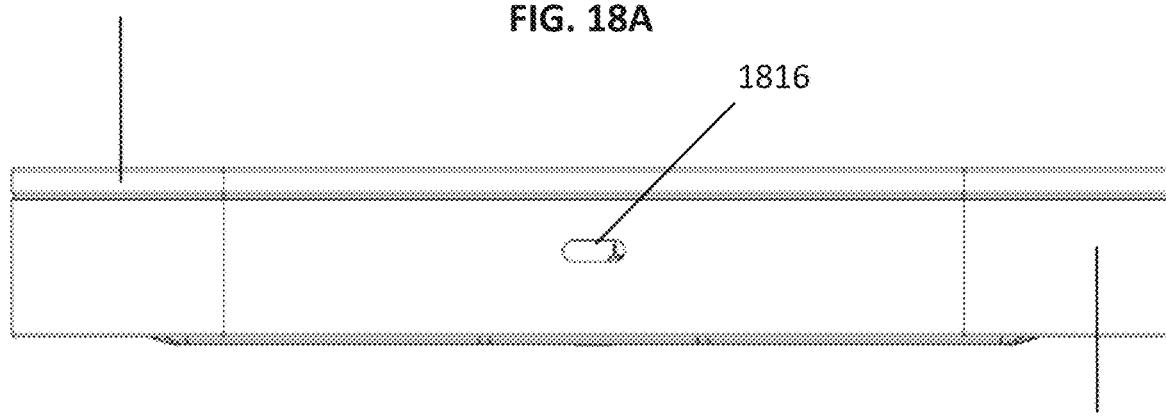
Figure 18C:
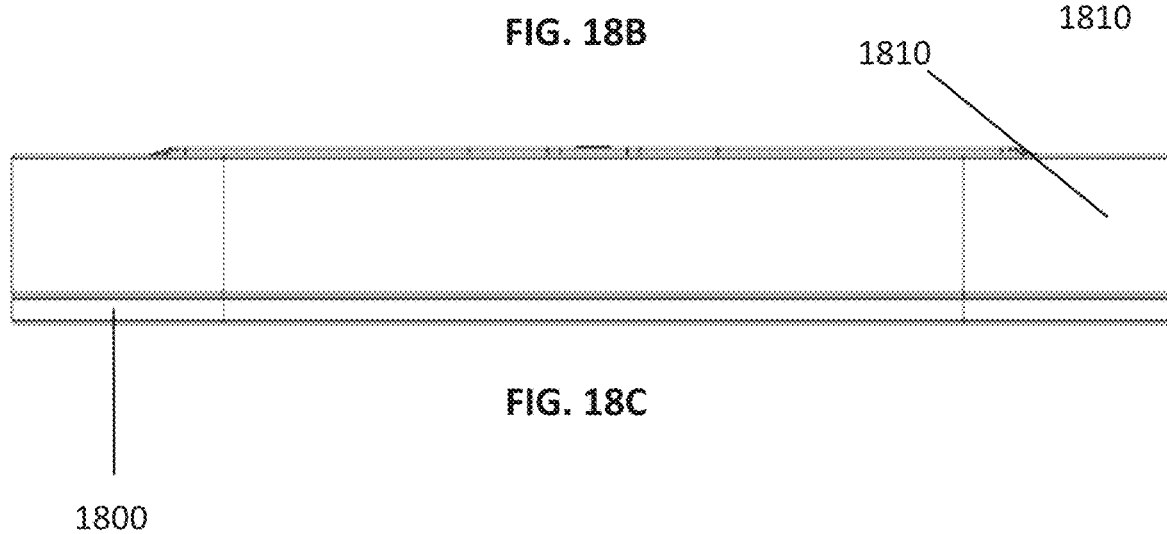
Figure 18D:
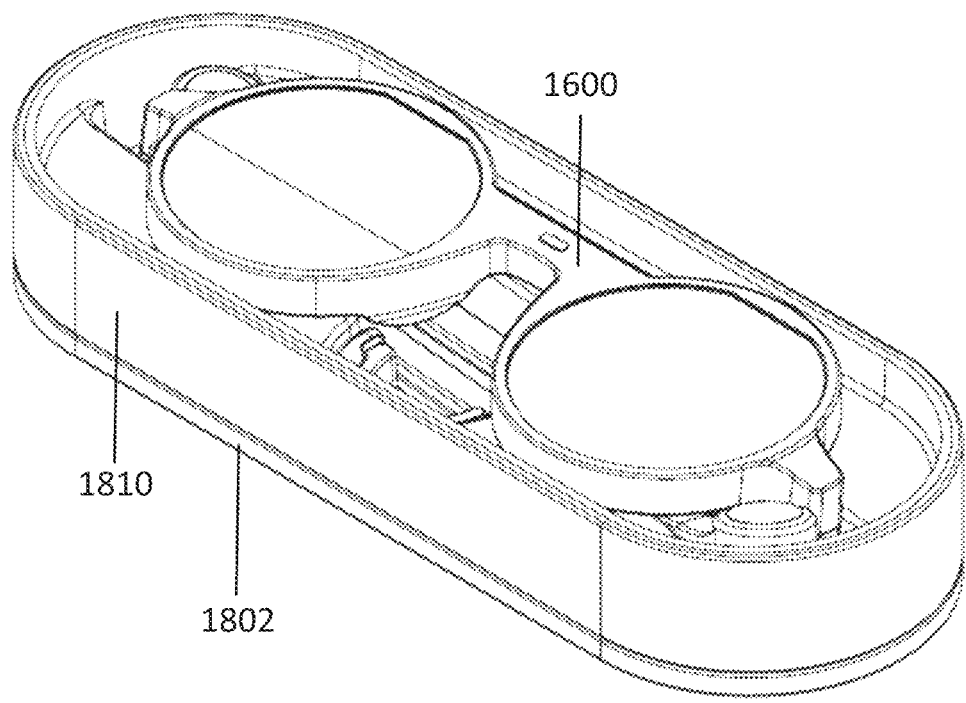
Figure 18E:
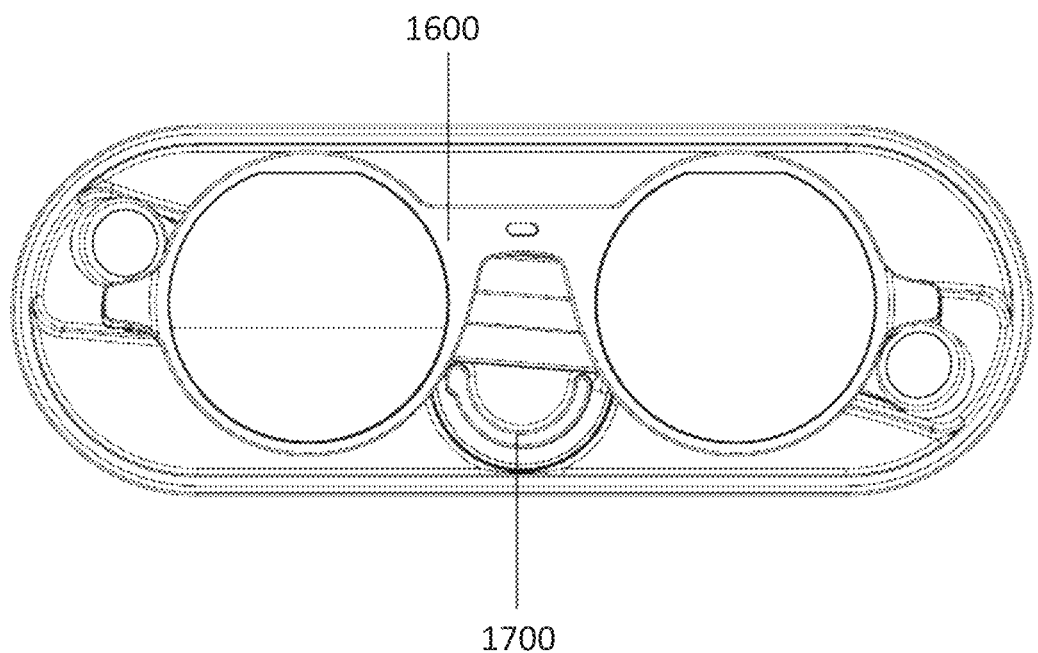

FIGS. 16K-16N illustrate views of an example arm assembly according to one embodiment of the augmented reality device as depicted in FIGS. 16A-F. The augmented reality device 1600 comprises two arms 1604, 1606. FIG. 16K is an example embodiment of arm 1606 with a distal end having a battery compartment 1601 with a door 1630. The door 1630 opens and closes to secure a battery in the battery compartment 1601.

In some embodiments, the arm and battery compartment are configured with two metal bars 1634, 1635 disposed within the arm. The metal bars 1634, 1635 provide strength and rigidity to the arm 1606 and also serve as terminals and electrical connection to a coin-shaped battery. Each arm 1604, 1606 of the augmented reality device 1600 may be configured with the metal bars. Metal bar 1635 has a distal terminal end 1636 and metal bar 1634 has a distal terminal end 1638. Each of the distal terminal ends 1636, 1638 make contact with and connect to respective sides of the coin battery. The metal bars 1634, 1635 may be shaped such that the distal terminal ends 1636, 1638 provide a compressive force on the sides of the battery thereby holding the battery in place within the battery compartment 1601. The metal bars 1634, 1635 provide positive and negative connections to the battery. The other ends of the metal are electrically connected to other components of the augmented reality device, via other wiring or flex circuits. In some embodiments, steel or other iron-based alloys are used for the metal bars. Other metals are suitable to be used for the metal bars provided they can provide an electrical connection to the battery and provide a strength and rigidity to an arm 1604, 1606.

FIGS. 17A-17B illustrate views of an example controller according to one embodiment of the present disclosure. According to this embodiment, the controller 1700 is shaped to be worn on the index finger with touch operation and input to the controller via the thumb. The controller (e.g., control ring) includes an upper housing 1702, a lower housing 1704, an adjustable strap 1706, charging pads 1708, touch controller 1710, a wireless module, a battery and electronic circuitry.

In some embodiment, the controller 1700 is a wearable controller with a body having a curved shape. The body includes the upper housing 1702 and the lower housing 1704. The housing includes a second processor to perform operations on the controller 1700 such as receiving and wirelessly transmitting commands or instructions to the augmented reality device 100, 1600. The controller 1700 includes a second processor that is configured to receive an input from the touch input surface and wirelessly transmit a command to the first processor.

The controller 1700 includes a touch input surface, such as a capacitive touch surface 1710 and may receive touch inputs to the touch input surface. For example, touch inputs may include a swipe gesture, a press and hold gesture, a tap gesture, a double tap gesture, and other gesture types. The controller 1700 and the augmented reality device 100, 1600 may be paired together such the inputs to the controller 1700 are transmitted to the augmented reality device 100, 1600. In response to receiving commands and/or instructions from the controller 1700, the augmented reality device performs predetermined operations for the particular command and/or instruction received from the controller.

The controller 1700 includes an adjustable strap 1706 allowing a user to strap the controller on to a digit of the user, such as the user's index finger. The strap may have a Velcro type of attachment mechanism to secure a portion of the strap back onto itself. For example, the wearable control mechanism 1700 may be configured to be worn on an index finger and receive touch operations from a thumb.

In some embodiments, the first processor of the augmented reality device 100, 1600 is configured to receive a command from the wearable control mechanism 1700. For example, in response to receiving a command, the processor causes an adjustment to the operation of the optical display device. In another example, the processor causes an image to be taken by the camera. The processor may process and display the images and/or virtual images via the optical display device 1612.

The augmented reality device 100, 1600 may be user configured to allow a particular operation to be performed based on a received touch input from the controller 1700. For purposes of illustration, but not limitation, augmented reality device 100, 1600 may be configured to performed any one of the operations: begin recording a video, stop recording a video; take a picture with the camera; zoom into an image displayed from the optical display device 1612; start recording audio, stop recording audio; initiate a phone call, end a phone call; etc.

In various arrangements, the augmented reality device 1600 can have zoom, pan, and tilt features using the onboard camera, such that magnified real view images can be presented to the user, and these functions can be performed digitally and/or in analog. The augmented reality device 1600 can also take single higher resolution pictures that are stored to local memory.

The touch sensitive user interface surface 1710 of the controller 1700 can also be used for tapping or sliding motions. For example, a slide motion along a touch sensitive user interface can be used to advance or rewinds a given image playback. Speed of slide motion can also affect the speed of advance or rewind on a given buffer clip.

The augmented reality device 1600 may include an onboard accelerometer or IMU (inertial measurement unit) can also be used as a user interface by capturing head movements or other user movements, and an onboard microphone can capture audio from the user and/or the user environment. The microphone and IMU may be used either in isolation or together to implement a tap-based gesture interface.

FIGS. 18A-18E illustrate views of an example system with a case, augmented reality device and a controller according to one embodiment of the present disclosure. According to this embodiment the case 1800 includes a magnetic lid 1802 and a base 1810. The base 1810 includes a docking tray 1812, a printed circuit board (not shown), a battery (not shown), a charging port 1817 and circuitry (not shown).

The case is configured to store and charge the augmented reality device 1600 and the controller 1700. The arms 1604, 1606 of the augmented reality device 1600 may be folded and the augmented reality device 1600 may be placed in the base 1810 in the docking tray 1812. The docking tray 1812 is shaped such that the augmented reality device may be positioned and secured within the docking tray. Additionally, the base includes a portion to hold the controller 1700.

While stored in the case 1800, both the augmented reality device 1600 and the controller 1700 may be charged via a charging connector port 1816 with charging connector, such as a USB-C connector. As noted previously, both the augmented reality device 1600 and the controller 1700 have charging pins or charging connectors. These connectors interface with pins or electrical connections in the case 1800 and will charge the augmented reality device 1600 and/or the controller 1700 when the charging cable is plugged into a power supply or source.

In some embodiments, the case 1800 has a lid 1802 with magnetic portions that attach to the base. In a closed position, the lid 1802 is placed on the top of the case 1800 thereby enclosing the augmented reality device 1600 and the controller 1700 in the case 1800. The lid 1802 may be removed from the case and be magnetically attached to the bottom of the case 1800.

Figure 19:
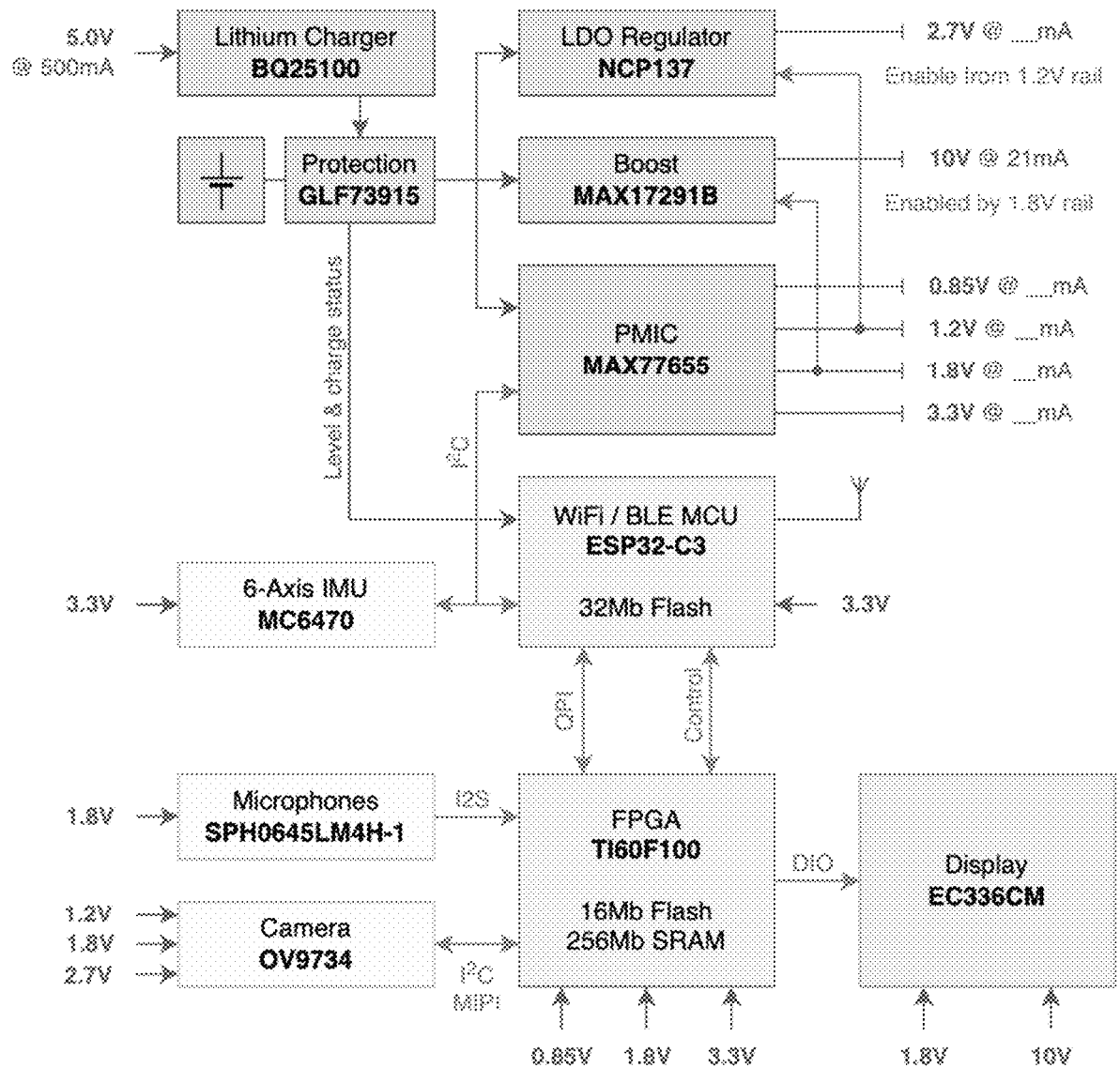
FIG. 19 is an example architecture of the augmented reality device as depicted in FIGS. 16A-16F.

FIG. 19 is an example architecture of the augmented reality device as depicted in FIGS. 16A-16F. In some embodiments, the augmented reality device 1600 includes two, and Field Programmable Gate Array (FPGA) subsystem and a wireless subsystem. In one mode of operation, the wireless subsystem is intended to be always on while the augmented reality device 1600 is in use. The FGPA subsystem handles all communication to and from the augmented reality device 1600, as well as coordinating and controlling the overall power and state of the augmented reality device 1600.

The FPGA subsystem is configured for handling infrequent and intense workloads such as graphics acceleration, video compression, machine learning acceleration, and other high bandwidth tasks. The surrounding components which benefit from this higher bandwidth capacity therefore connect directly to the FPGA Subsystem (e.g., display, camera and microphone), while lower bandwidth components (accelerometer and compass) connect directly to the wireless subsystem. Each subsystem communicates to one another over a serial interface.

In some embodiments, the wireless subsystem has full control of the power state for the entire augmented reality device 1600. The wireless subsystem manages the system voltage rails via the PMIC (Power Management IC). To conserve power, the wireless subsystem may shutdown power to the FPGA Subsystem, and places itself into a low power state until events occur which require parts of the system to be woken up.

Additionally, the entire augmented reality device 1600 may be put into a deep sleep state while stored in the charging case 1800. In this state, all subsystems are shutdown, and only the wireless subsystem wakes up to periodically check the charging state of the augmented reality device 1600.

In some embodiments, a wireless processor is configured to be the central point of control for the augmented reality device 1600. The wireless processor may include firmware which can control every part of the hardware (e.g., electronic components of the augmented reality device 1600). The wireless processor manages access from remote wireless networks, to control the augmented reality device 1600. Additionally, the firmware may use a TCP/IP stack to communicate with the Internet to fetch or push data from server-based applications using standardized protocols.

In some embodiments, the augmented reality device 100, 1600 is configured to receive string payloads via a Bluetooth connection with another client device. For example, the client device may use a raw string Service to send/receive data from to/from the augmented reality device 100, 1600. The Bluetooth specification provides for using a Service which is a container for logically related Bluetooth data items. The Bluetooth data items are referred to as Characteristics. Typically, Characteristics are data items which related to a state of a device or state of a sensor, for example a battery level. However, the augmented reality device and paired client device (such as a computer, laptop, phone, tablet, etc.) may communication using a string payload as a Characteristic. The paired client device can send strings of data from the client device to the augmented reality device 100, 1600.

In some embodiments, the augmented reality device 100, 1600 includes a string interpreter that interprets the string payload and causes the augmented reality device 100, 1600 to perform instructions or actions based on commands and/or data in the string payload. The string payloads may include Python code, scripts, non-Python code, textual data, alphanumeric data, hexadecimal data, binary data and/or a combination of any of the foregoing. For example, the string interpreter may be a Python interpreter. The augmented reality device 100, 1600 is configured such that during a paired BlueTooth connection with a client device, the Python interpreter waits (e.g., listening) to receive the string payload. In response to receiving the string payload by the augmented reality device 100, 1600, the Python interpreter processes the string payload by inputting the string payload into the Python interpreter.

In some embodiments, the augmented reality device 100, 1600 stores Python code or scripts in a storage area of the augmented reality device 100, 1600. The augmented reality device 100, 1600 may receive one or more string payloads which include Python code with commands or instructions to execute or perform the Python code or scripts. The string payload is input into the Python interpreter which performs the Python code with the commands or instructions in the string payload, which in turn performs the referenced Python code or scripts resident in the storage area of the augmented reality device 100, 1600. The augmented reality device 100, 1600 may create a payload string of textual output generated from the Python interpreter. The created payload string may be sent from the augmented reality device 100, 1600 to the client device via the raw string Service.

In some embodiments, the augmented reality device 100, 1600 provides for OTA (over-the-air) (e.g., wireless) updates to the FPGA. For example, the augmented reality device 100, 1600 uses the wireless processor as a central point of control for the augmented reality device 100, 1600 and may turn the FPGA on or off. The wireless processor controls or interacts with the FPGA and the FGPA may be updated by the wireless processor. An update file for an FPGA circuit may be received from a client device and written to a storage area of the augmented reality device 100, 1600. For example, one or more string payload including Python commands and the update file may be sent via the Bluetooth raw string Service. The Python Interpreter may then write the update file to the storage area. For example, the FPGA update file may be a configuration file (e.g., an FPGA image file, FPGA configuration file, FPGA binary file, FPGA text file, etc.) of a new circuit configuration for the FPGA. The Python interpreter may further receive commands that cause the wireless processor to update the FPGA. For example, the wireless processor may send an "FPGA run false" false command to turn off the FPGA. The wireless processor may send an "FPGA erase" command to erase a current image file of the FPGA. The wireless processor may send one or more "FPGA write" commands referencing a full or partial image file. This command writes the image file to the FPGA. The wireless processor may send an "FPGA run" command to turn on the FPGA. The run command causes the FPGA to turn on the FPGA using the newly written image file.

Figure 20:
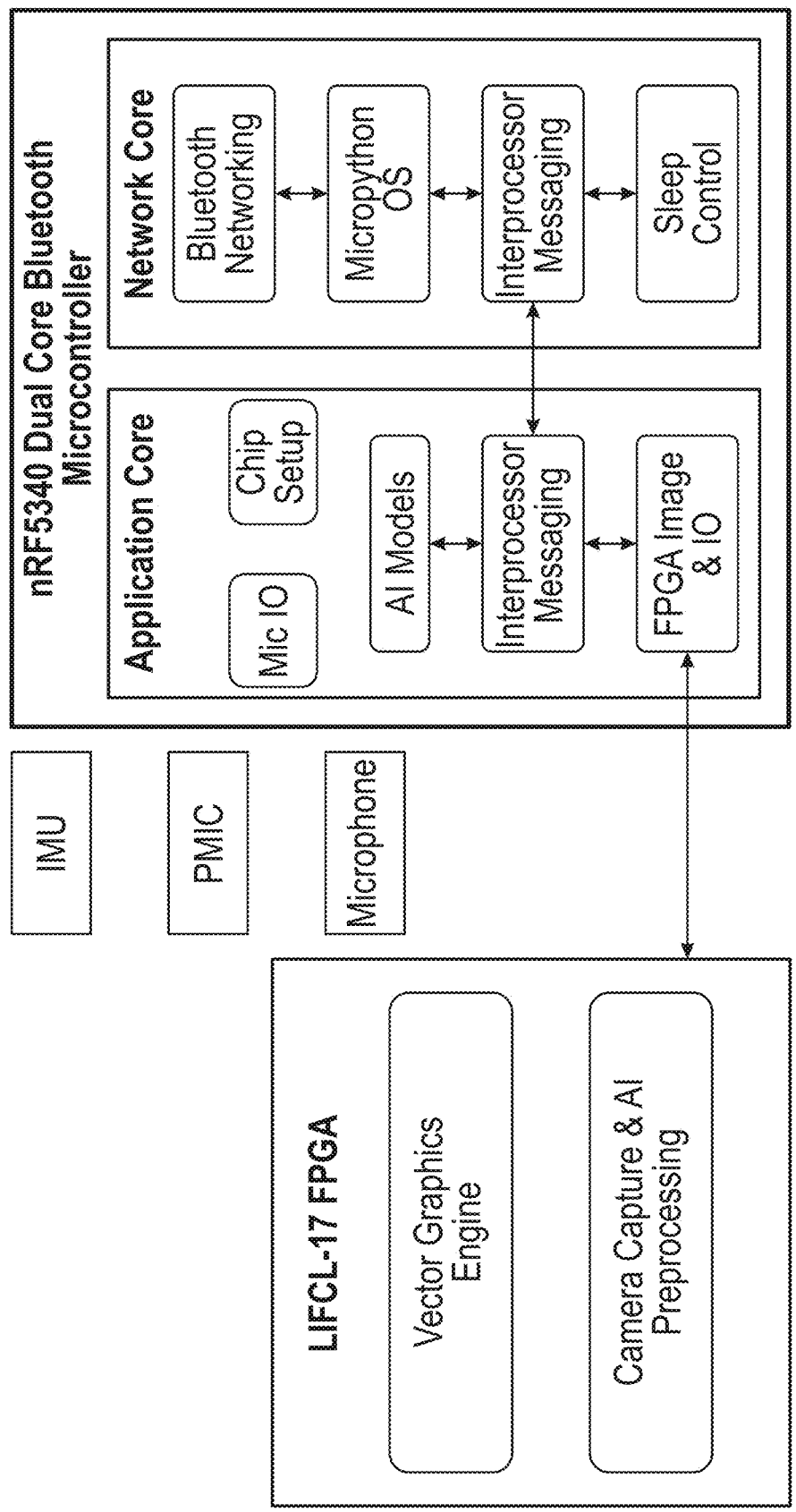
FIG. 20 is an example architecture of the augmented reality device as depicted in FIGS. 16A-16F.

FIG. 20 is an example architecture of the augmented reality device as depicted in FIGS. 16A-16F. FIG. 20 is an example of an architecture of the augmented reality device as depicted in FIGS. 16A-16F. In some embodiments, the augmented reality device 1600 includes a Field Programmable Gate Array (FPGA) subsystem comprising a vector graphics engine and a camera image capture and artificial intelligence preprocessing, and a Dual Core Bluetooth Microcontroller comprising an Application Core and a Network Core. The FPGA interfaces with the Microcontroller. The Application Core includes modules for handling microphone signal process, chip setup and configuration, AI model usage and processing, interprocessor messaging, and FPGA image input and output. The Application Core includes an interprocessor messaging module that communicates with the Network Core. The Network Core includes modules for Bluetooth Networking, operation system processing (e.g., using a Micropython-based operating system), interprocessor messaging, and sleep and wake up operations of the augmented reality device 1600.

Additionally, the augmented reality device also includes an inertial measurement unit (IMU) system, a power management integrated circuit (PMIC), a microphone, and a camera. These components are electronically interconnected with the FPGA and Microcontroller. In one mode of operation, the Network Cores is intended to be always on or a low power sleep mode. The Vector Graphics Engine performs graphics processing, and the Camera Capture and AI module performs image capture and process and artificial intelligence preprocessing. The Vector Graphics Engine is configured to create vector graphics for display via the display of the augmented reality device 1600. For example, the Vector Graphics Engine may create graphics such as drawing lines, circles, rectangles and other geometric shapes.

One or more trained machine learning models may be stored on a storage media or device of the augmented reality device 1600. Images obtained form the onboard camera may be input into the trained machine learning models for evaluation (such as object detection or classification of the images). In some examples of operations, sub-images of the obtained images are generated and input into the trained machine learning models. For example, groups of pixels (smaller than the entire image) may be evaluated by the trained machine learning models. Moreover, the images or groups of pixels may be converted to gray scale. Removing color information from the images reduces the processing requirements for evaluation of the images or groups of pixels via the one or more trained machine learning models.

Figure 21A:
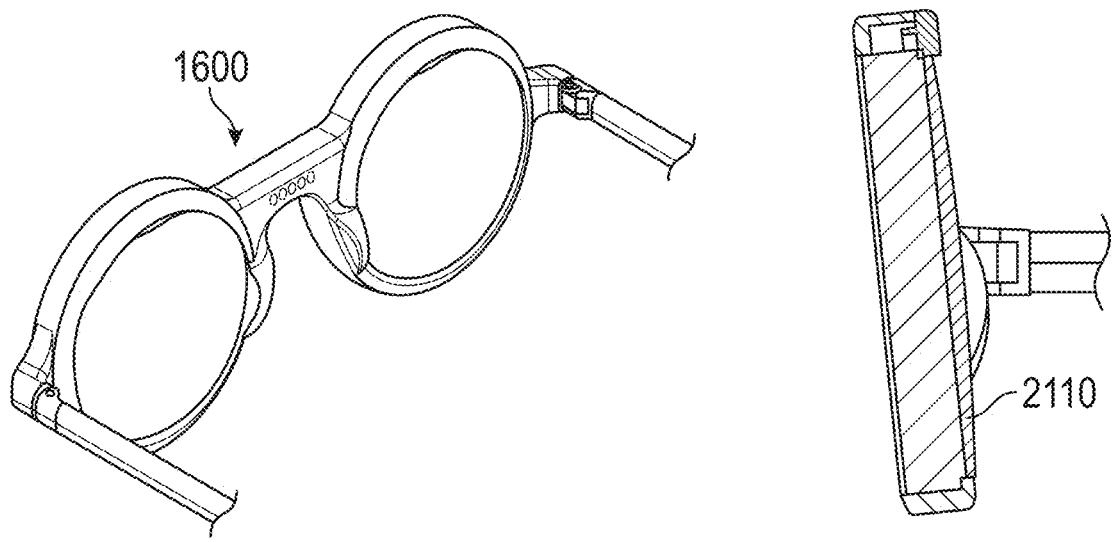
FIGS. 21A-21B illustrate views of an example augmented reality device with corrective lenses according to one embodiment of the present disclosure as depicted in FIGS. 16A-16F.
Figure 21B:
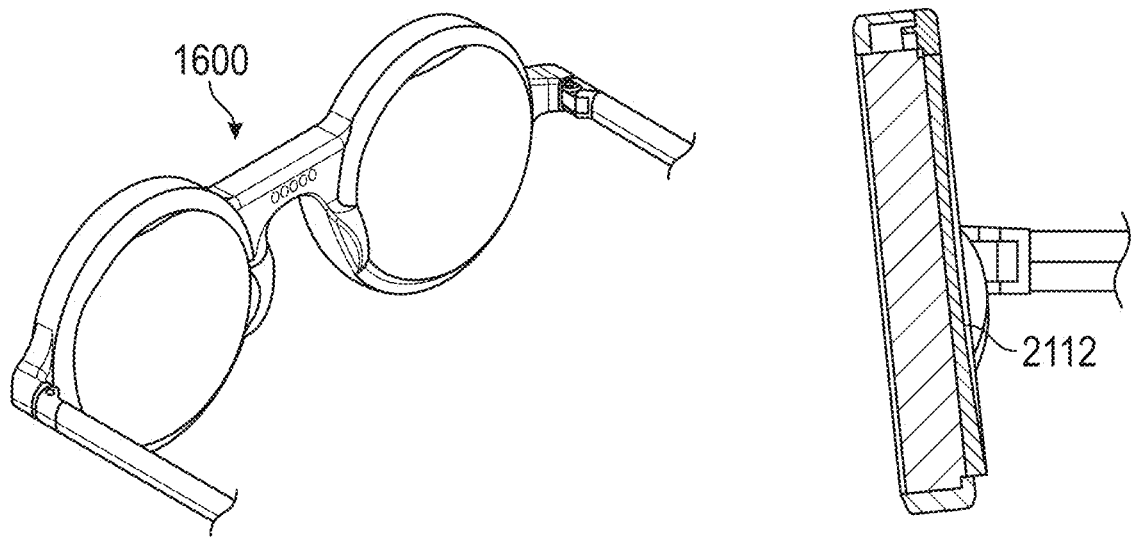

FIGS. 21A-21B illustrate views of an example augmented reality device with corrective lenses according to one embodiment of the present disclosure as depicted in FIGS. 16A-16F. The augmented reality device 1600 may be fitted with corrective lenses that are attached to a surface of the first lens optical element 1614 and/or the second lens optical element 1616. For example, corrective lenses to correct for myopia or hyperopia may be bonded or adhered to a surface of the lens optical elements 1614, 1616 (such as attaching to the rear surface of the optical elements). The corrective lenses may be made from material typically used for vision correction, such as polyethylene, Trivex, polycarbonate, high-index polymers or glass. The corrective lenses may be attached such that the corrective lenses are fixed and non-removeable, or the corrective lenses may be removably attached to the lens optical elements 1614, 1616. Corrective lens 2110 is an example of +2 convex lens with an edge thickness of about 1 mm and a center thickness of about 1.922 mm. Corrective lens 2112 is an example of a −2 concave lens with an edge thickness of about 1 mm and a center thickness of about 1.854 mm.

It will be appreciated that the present disclosure may include any one and up to all of the following examples.

Example 1. A wearable augmented reality device comprising: a frame comprising a frame body; a first arm hingedly attached to the frame body; a second arm hingedly attached to the frame body; a camera positioned in a front portion of the frame body; a first processor positioned in the frame body; an optical display device positioned in a top portion of the frame body; a first lens optical element; a second lens optical element; a combiner prism optical element; wherein the first processor is configured to: project from the optical display device processed camera images towards the combiner prism optical element such that light emitted from the optical display device passes through a top portion of the second lens optical element and the combiner prism optical element and is projected from the second lens optical element back toward the combiner prism optical element, and then is reflected from a bottom portion of the combiner prism optical element towards a focused display position towards an eye of a wearer of the wearable augmented reality device.

Example 2. The wearable augmented reality device of Example 1, wherein the first arm comprises a battery compartment in distal end of the first arm.

Example 3. The wearable augmented reality device of any one of Examples 1-2, wherein the first arm is hingedly attached to the frame body at a degree of tilt ranging from 3-10 degrees.

Example 4. The wearable augmented reality device of any one of Examples 1-3, wherein the combiner prism optical element has a spherical reflective surface.

Example 5. The wearable augmented reality device of any one of Examples 1-4, wherein when the first arm and the second arm are in a folded position they are parallel to each other.

Example 6. The wearable augmented reality device of any one of Examples 1-5, wherein the processor is further configured to move the focused display position by adjust a position of the image being projected from the optical display device.

Example 7. The augmented reality device of any one of Examples 1-6, further comprising: a wearable control mechanism, comprising: a body having a curved shape; a second processor; a touch input interface; and an adjustable strap.

Example 8. The augmented reality device of any one of Examples 1-7, wherein the wearable control mechanism is configured to be worn on a index finger and receive touch operations from a thumb.

Example 9. The augmented reality device of any one of Examples 1-8, wherein the second processor is configured to receive an input from the touch input surface and wirelessly transmit a command to the first processor.

Example 10. The augmented reality device of any one of Examples 1-9, wherein the first processor is further configured to: receive a command from the wearable control mechanism; and cause an adjustment to the operation of the optical display device.

Example 11. The augmented reality device of any one of Examples 1-10, wherein the first processor is further configured to: receive a command from the wearable control mechanism; and cause an image to be taken by the camera.

Example 12. The augmented reality device of any one of Examples 1-11, wherein the processed camera images comprise one or more virtual images.

Example 13. The augmented reality device of any one of Examples 1-12, wherein the optical display device is a micro-OLED.

Example 14. The augmented reality device of any one of Examples 1-13, further comprising: a rear housing element configured for attachment to a rear portion of the frame body.

Example 15. The augmented reality device of any one of Examples 1-4, wherein the rear housing element comprises charging connectors.

Example 16. The augmented reality device of any one of Examples 1-15, wherein the first processor is positioned in the frame body in an internal area adjacent to a nose bridge of the frame body.

Example 17. The augmented reality device of any one of Examples 1-17, further comprising a reinforcement bracket positioned in the internal area, and a camera module holding the camera is affixed thereto.

Example 18. The augmented reality device of any one of Examples 1-18, wherein the combiner prism optical element is positioned in the second lens optical element.

Example 19. The augmented reality device of any one of Examples 1-19, wherein the second lens optical element is a solid optical lens without a combiner prism optical element.

Example 20. The augmented reality device of any one of Examples 1-20, wherein the bottom portion of the combiner prism optical element has a coated and partially reflecting mirrored surface having the characteristics of a high reflection low incident angle and high transmission at high angles.

Some portions of the preceding detailed descriptions have been presented in terms of algorithms, equations and/or symbolic representations of operations on data bits within a computer memory. These algorithmic and/or equation descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including read-only memories (ROMs), random access memories (RAMs), EPROMS, EEPROMs, magnetic cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementation of the disclosure as set forth in the following claims. The disclosure and drawings are, accordingly, to be regarded in an illustrative sense rather than a restrictive sense.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A wearable augmented reality device comprising:
    a frame comprising a frame body, the frame body having an internal area;
    a first arm hingedly attached to the frame body;
    a second arm hingedly attached to the frame body, wherein the first arm comprises a first bar and a second bar disposed within the first arm, the first bar having a first distal terminal end that makes contact with a positive connection of a first battery and the second bar having a second distal terminal end that makes contact with a negative connection of the first battery;
    a camera positioned in a front portion of the frame body in the internal area, wherein the camera captures images through the front portion of the frame body;
    a first processor positioned in a portion of the augmented reality device, the first processor configured to perform artificial intelligence processing;
    an optical display device positioned in a portion of the frame body, wherein the optical display device is connected to the first processor;
    a first lens optical element;
    a second lens optical element; and
    a storage device comprising one or more machine learning models accessible by the first processor.

2. The wearable augmented reality device of claim 1, wherein the first processor comprises a vector graphics engine configured to perform vector graphics processing, and a camera capture image module configured to capture images from the camera.

3. The wearable augmented reality device of claim 1, further comprising:
    a power management circuit; and
    a wireless subsystem connected to the power management circuit, wherein the wireless subsystem is configured to control power to the first processor, wherein the wireless subsystem is configured to operate in a low power state and in an awake state, and wherein first processor and the wireless subsystem communicate to one another via an interface.

4. The wearable augmented reality device of claim 1, wherein the one or more machine learning models are configured to receive groups of pixels smaller than an entire image captured by the camera.

5. The wearable augmented reality device of claim 1, further comprising:
    the frame body comprising a nose bridge having the internal area of the frame body, the internal area being positioned between a first lens optical element and a second lens optical element; and
    a camera module holding the camera, wherein the camera module is positioned in the internal area.

6. The wearable augmented reality device of claim 1, further comprising:
    the frame body comprising a nose bridge having the internal area of the frame body, the internal area being positioned between a first lens optical element and a second lens optical element; and
    a circuit board with the first processor, wherein the circuit board is positioned in the internal area.

7. The wearable augmented reality device of claim 1, further comprising:
    the frame body comprising a nose bridge having the internal area of the frame body, the internal area being positioned between a first lens optical element and a second lens optical element; and
    a rear housing element configured for attachment to a rear portion of the frame body, the rear housing element comprising charging connectors.

8. The wearable augmented reality device of claim 1, further comprising:
    wherein the second arm comprises a first bar and a second bar disposed within the second arm, the first bar of the second arm having a first distal terminal end that makes contact with a positive connection of a second battery and the second bar of the second arm having a second distal terminal end that makes contact with a negative connection of the second battery.

9. The wearable augmented reality device of claim 1, further comprising:
    another optical element, wherein the optical display device projects light, via the another optical element, towards an eye of a wearer of the wearable augmented reality device.

10. A wearable augmented reality device comprising:
    a frame comprising a frame body;
    a first arm hingedly attached to the frame body, the first arm comprising a first bar and second bar disposed within the first arm, wherein the first bar and second bar provide an electrical connection to a first battery;
    a second arm hingedly attached to the frame body, the second arm comprising a third bar and a fourth bar disposed within the second arm, wherein the second bar and third bar provide an electrical connection to a second battery;
    a camera positioned in a front portion of the frame body;
    a first processor positioned in the frame body, the first processor configured to perform artificial intelligence processing;
    an optical display device positioned in a top portion of the frame body, wherein the optical display device is connected to the first processor;
    a storage device comprising one or more machine learning models accessible by the first processor;

a first lens optical element;
a second lens optical element; and
a combiner prism optical element;
wherein the first processor is configured to project from the optical display device processed camera images towards the combiner prism optical element such that light emitted from the optical display device passes through a top portion of the second lens optical element and the combiner prism optical element and is projected from the second lens optical element back toward the combiner prism optical element, and then is reflected from a bottom portion of the combiner prism optical element towards a focused display position towards an eye of a wearer of the wearable augmented reality device.

11. The wearable augmented reality device of claim 10, further comprising:
a power management circuit; and
a wireless subsystem connected to the power management circuit, wherein the wireless subsystem is configured to control power to the first processor, wherein the wireless subsystem is configured to operate in a low power state and in an awake state, and wherein first processor and the wireless subsystem communicate to one another via an interface.

12. The wearable augmented reality device of claim 10, wherein the one or more machine learning models are configured to receive groups of pixels smaller than an entire image captured by the camera.

13. The wearable augmented reality device of claim 10, wherein the first processor comprises a vector graphics engine configured to perform vector graphics processing, and a camera capture image module configured to capture images from the camera.

14. A wearable augmented reality device comprising:
a frame comprising a frame body, the frame body having an internal area;
a first arm hingedly attached to the frame body;
a second arm hingedly attached to the frame body;
a camera positioned in a front portion of the frame body in the internal area, wherein the camera captures images through the front portion of the frame body;
a first processor positioned in a portion of the augmented reality device, the first processor configured to perform artificial intelligence processing;
an optical display device positioned in a portion of the frame body, wherein the optical display device is connected to the first processor;
a first lens optical element;
a second lens optical element;
a storage device comprising one or more machine learning models accessible by the first processor;
a power management circuit; and
a wireless subsystem connected to the power management circuit, wherein the wireless subsystem is configured to control power to the first processor, wherein the wireless subsystem is configured to operate in a low power state and in an awake state, and wherein first processor and the wireless subsystem communicate to one another via an interface.

\* \* \* \* \*